US008793441B2

(12) United States Patent
Factor et al.

(10) Patent No.: US 8,793,441 B2
(45) Date of Patent: Jul. 29, 2014

(54) SYSTEM, METHOD AND COMPUTER PROGRAM PRODUCT FOR MANAGING DATA USING A WRITE-BACK CACHE UNIT

(75) Inventors: Michael E. Factor, Haifa (IL); Shachar Fienblit, Ein Ayala (IL); Guy Laden, Jaffa (IL); Dean Har'el Lorenz, Haifa (IL); Shlomit Sarah Pinter, Haifa (IL); Paula Kim Ta-Shma, Tel-Aviv-Jaffa (IL)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 11/959,830

(22) Filed: Dec. 19, 2007

(65) Prior Publication Data

US 2008/0155198 A1    Jun. 26, 2008

(30) Foreign Application Priority Data

Dec. 20, 2006  (GB) .................................. 0625330.6

(51) Int. Cl.
  *G06F 12/00*  (2006.01)
(52) U.S. Cl.
  USPC ........... 711/143; 711/118; 711/141; 711/154; 707/638; 707/695
(58) Field of Classification Search
  USPC ........... 711/118, 141, 143, 154; 707/638, 695
  See application file for complete search history.

(56) References Cited

U.S. PATENT DOCUMENTS 5,933,593 A * 8/1999 Arun et al. ..................... 714/6
6,192,377 B1 * 2/2001 Ganesh et al. ................. 1/1
6,289,358 B1 * 9/2001 Mattis et al. .................. 1/1
6,502,108 B1 * 12/2002 Day et al. ...................... 1/1
6,507,853 B2 * 1/2003 Bamford et al. ............... 1/1
7,293,137 B2 * 11/2007 Factor et al. ................ 711/113
7,636,814 B1 * 12/2009 Karr et al. ................... 711/143
7,664,766 B2 * 2/2010 Factor et al. ................ 707/802

(Continued)

FOREIGN PATENT DOCUMENTS

JP    5346889    12/1993
JP    6095968    4/1994

(Continued)

OTHER PUBLICATIONS

IEEE 100: The Authoritative Dictionary of IEEE Standards Terms, Dec. 2000, IEEE Press, Seventh Edition, pp. 508.*

(Continued)

*Primary Examiner* — Arpan P. Savla
(74) *Attorney, Agent, or Firm* — Fleit Gibbons Gutman Bongini & Bianco PL; Thomas Grzesik

(57) ABSTRACT

A method for managing data, the method includes: providing a write-back cache unit coupled to at least one storage unit; receiving a request to write a new data version to a certain cache data allocation unit; determining, in response to a data storage policy, whether to overwrite a cached data version being cached in the certain cache data allocation unit or to perform a destage of the cached data version to a first storage unit before writing the new data version to the certain cache allocation unit; receiving a request to read a data version that corresponds to a certain point in time and scanning a first data structure representative of write operations and a second data structure representative of revert operations to determine a location of the requested data version.

26 Claims, 16 Drawing Sheets

(56) References Cited

U.S. PATENT DOCUMENTS

| | | |
|---|---|---|
| 2003/0018684 A1 | 1/2003 | Ohsawa et al. |
| 2004/0117572 A1 | 6/2004 | Welsh et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0071379 A1 | 3/2005 | Kekre et al. |
| 2005/0076261 A1 | 4/2005 | Rowan et al. |
| 2005/0076262 A1 | 4/2005 | Rowan et al. |
| 2005/0076264 A1 | 4/2005 | Rowan et al. |
| 2005/0193272 A1 | 9/2005 | Stager et al. |
| 2007/0168707 A1 | 7/2007 | Kern et al. |

FOREIGN PATENT DOCUMENTS

| | | |
|---|---|---|
| JP | 2003216491 | 7/2003 |
| JP | 2005267301 | 9/2005 |
| JP | 2005339554 | 12/2005 |
| WO | 02/073416 | 9/2002 |
| WO | 2004/068469 | 8/2004 |

OTHER PUBLICATIONS

Communication Relating to Results of Partial International Search PCT/EP2007/064213.

T.N. Vijaykumar, et al., "Speculative Versioning Cache," IEEE Transactions on Parallel and Distributed Systems, vol. 12, No. 12, Dec. 2001.

Jiang et al., "The BT-Tree: A Branched and Temporal Access Method," Proceedngs of the 26$^{th}$ VLDB Conference, 2000.

Jiang et al., "The BTR-Tree: Path Defined Version-Range Splitting in a Branched and Temporal Structure," Symposium for Advances in Spatial and Temporal Databases, 2003.

* cited by examiner

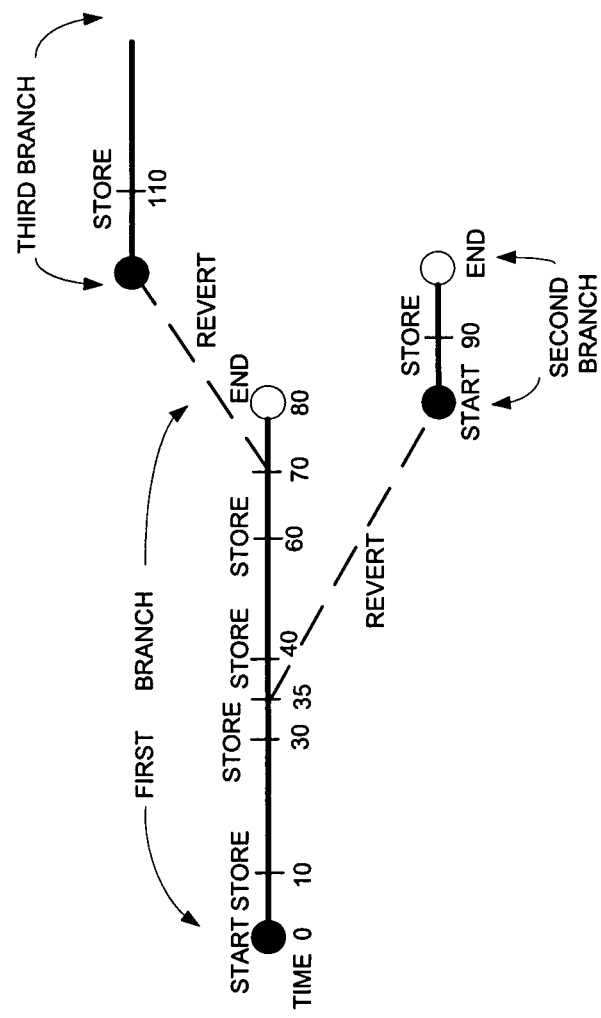
101 Figure 2

300

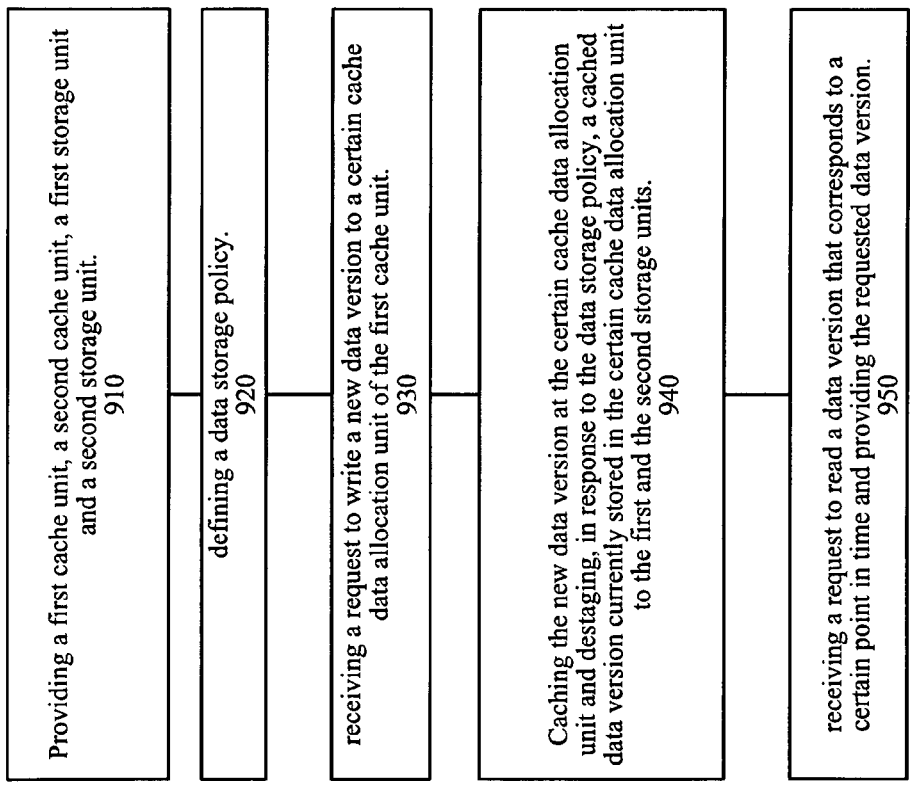

SYSTEM, METHOD AND COMPUTER PROGRAM PRODUCT FOR MANAGING DATA USING A WRITE-BACK CACHE UNIT

CROSS-REFERENCE TO RELATED APPLICATIONS

This application is based upon and claims priority from prior United Kingdom Patent Application No. 0625330.6 filed on Dec. 20, 2006 the entire disclosure of which is herein incorporated by reference.

FIELD OF THE INVENTION

The present invention relates to methods, systems and computer program products for managing data using a write-back cache unit.

BACKGROUND OF THE INVENTION

Data can evolve over time. In many applications there is a need to retrieve a previous data version. One of these applications is the continuous data protection (CDP) application. U.S. patent application publication serial number 2005/0066118 of Perry et al., and U.S. patent application publication serial number 2005/0193272, all being incorporated herein by reference, describe prior art devices and method for continuous data protection.

Various data structures were suggested for tracking the evolution of data over time. The following articles, both being incorporated herein by reference, illustrates two data structures known as the B-tree and the BTR-Tree: "The BT-Tree: A Branched and Temporal Access Method", Jiang, Salzberg, Lomet, Barrena, Proceedings of the 26th VLDB Conference, 2000; "The BTR-Tree: Path-Defined Version-Range Splitting in a Branched and Temporal Structure", Jiang, Salzberg, Lomet, Barrena, Symposium for Advances in Spatial and Temporal Databases, 2003.

These branch temporal indexes can be maintained if certain assumptions are fulfilled. According to a first assumption entries of the branch temporal indexes are inserted in order of increasing timestamp.

In addition, the update of these structures can be relatively complex and involve duplicating data and even metadata. In addition the maintenance of these data structures may require reference counters.

The following U.S. patent applications and U.S. patents, all being incorporated herein by reference, also describe various methods for managing data: U.S. patent application publication serial number 2005/0066222 of Rowan et al., U.S. patent application publication serial number 2005/0076262 of Rowan et al., U.S. patent application publication serial number 2005/0065962 of Rowan et al.; U.S. patent application publication serial number 2005/0063374 of Rowan et al.; U.S. patent application publication serial number 2005/0076264 of Rowan et al.; U.S. patent application publication serial number 2005/0066225 of Rowan et al.; U.S. patent application publication serial number 2005/0076261 of Rowan et al.; U.S. patent application publication serial number 2005/0066118 of Perry et al., and U.S. patent application publication serial number 2005/0071379 of Kekre et al., and US Patent Application publication serial number 2004/0117572 titled "Persistent Snapshot Methods".

There is a growing need to provide devices, computer program products and methods that will enable to manage data, especially using write-back cache units.

SUMMARY OF THE PRESENT INVENTION

According to an embodiment of the invention a method for managing data is provided. The method includes: providing a write-back cache unit coupled to at least one storage unit; receiving a request to write a new data version to a certain cache data allocation unit; determining, in response to a data storage policy, whether to overwrite a cached data version being cached in the certain cache data allocation unit or to perform a destage of the cached data version to a first storage unit before writing the new data version to the certain cache allocation unit; receiving a request to read a data version that corresponds to a certain point in time and scanning a first data structure representative of write operations and a second data structure representative of revert operations to determine a location of the requested data version.

Conveniently, the method includes destaging different data versions to a first storage unit and a to a second storage unit and maintaining a third data structure indicative of which data version to send from the first storage unit to a second storage unit.

Conveniently, the method includes maintaining a fourth data structure indicating a location of data version to be staged to the cache.

Conveniently, the method includes utilizing intercepts to provide the location of the requested data version.

Conveniently, the method includes destaging a cached data version to a first storage unit to provide a destaged data version and sending an older data version that was previously destaged to the first storage unit to the second storage unit.

Conveniently, the sending of the older data version includes generating a dummy entry that includes a timing of the sending of the older data version.

Conveniently, the sending of the older data version includes staging the older data version to a write-back cache unit and destaging the older data version from the write-back cache unit to the second storage unit.

Conveniently, the method includes physically copying an old data version, from the second storage unit to a first storage unit, in response to a revert operation, while updating the fourth data structure.

Conveniently, the determining, in response to a data storage policy, whether to overwrite a cached data version, includes determining whether a multi-version cache unit can store an additional version of data.

Conveniently, the method includes destaging different data versions to a single storage unit.

BRIEF DESCRIPTION OF THE DRAWINGS

The present invention will be understood and appreciated more fully from the following detailed description taken in conjunction with the drawings in which:

FIG. 2 illustrates an exemplary sequence of write and revert operations according to an embodiment of the invention;

FIG. 9B illustrates a method for managing data according to a further embodiment of the invention.

DETAILED DESCRIPTION OF THE DRAWINGS

Figure 1A:
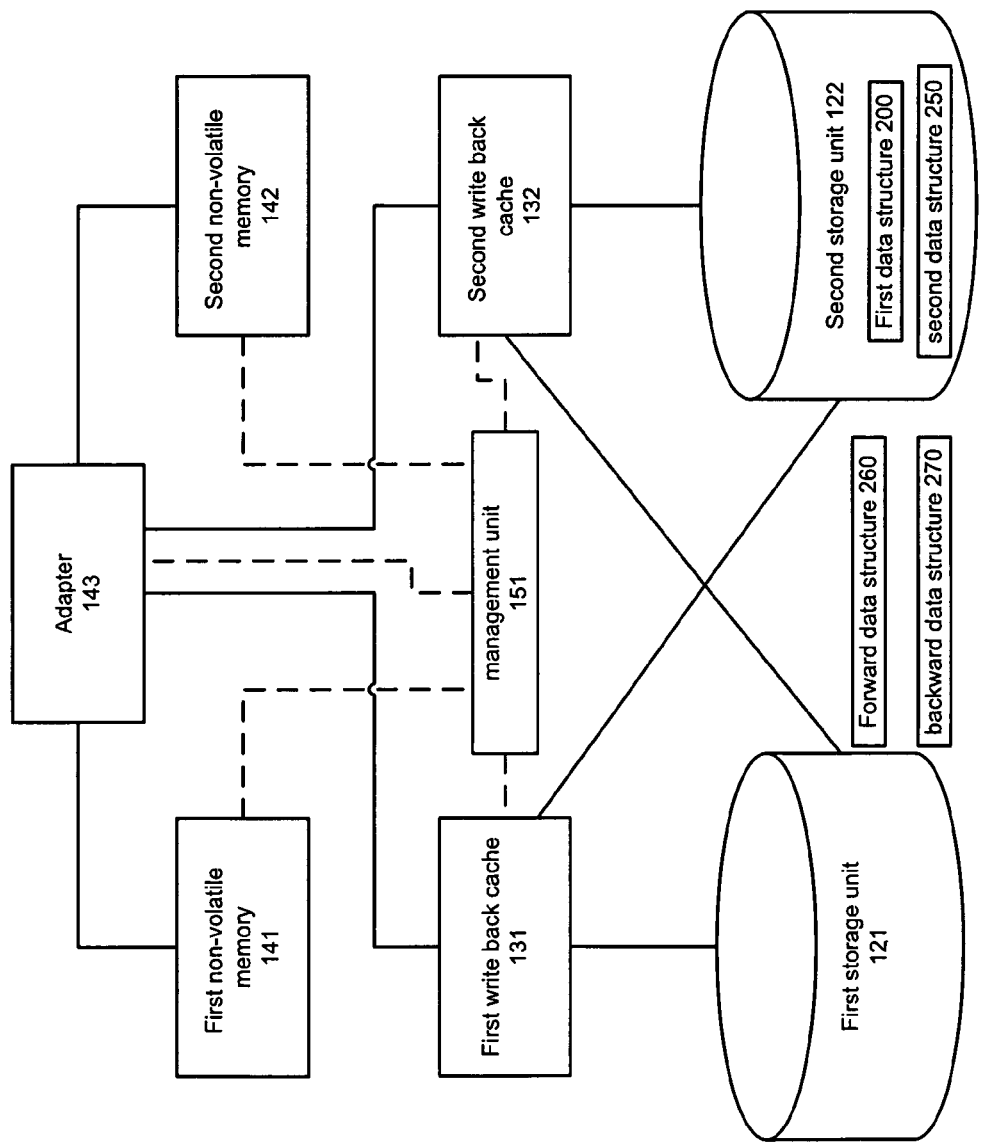
FIG. 1A illustrates a system for managing data, according to a further embodiment of the invention.

The invention provides a method, system and computer program product for storing and retrieving multiple data versions while using a write-back cache unit.

According to an embodiment of the invention data is written to a write-back cache unit to provide a cached data version and afterwards be destaged to a first storage unit to provide a destaged data version. The destaged data version is also referred to as a current data version. According to an embodiment of the invention the current data versions and older data versions are stored in the same logical storage unit. It is noted that throughout this application the term "storage unit" can include a logical storage unit or a physical storage unit. A logical storage unit can be a LUN or a volume. It is noted that multiple logical storage units can reside in a single physical storage unit.

According to an embodiment of the invention a cache unit that supports multiple versions of data (multi-version cache unit) can be provided. Accordingly, the destage of a certain version of data can be delayed until a predefined number of versions are already stored in the cache unit.

According to another embodiment of the invention the current data version is treated differently than older data versions. The different treatment usually includes storing the older data versions in a logically separate storage unit. This embodiment is also referred to as the distributed embodiment and a system that supports this embodiment has a distributed architecture.

According to another embodiment of the invention the current data version and the older data versions are stored in the same data storage unit. This embodiment is referred to as the centralized embodiment and a system that supports this embodiment has a centralized architecture.

According to yet a further embodiment of the invention a combination of the distributed embodiment and the centralized embodiment is provided.

According to further embodiments of the invention cached data versions are also stored in a non-volatile memory unit.

According to various embodiments of the invention multiple cache units and multiple data storage units are provided. Various relationships can be defined between these cache units and the multiple data storage units are provided.

Conveniently, the centralized architecture includes a cache and a first storage unit. The first storage unit is conveniently a persistent memory unit and it stores current data version and older data versions. The distributed architecture includes a cache, a first storage unit and a second storage unit, where the current data version is stored in the first storage unit and older data versions are stored in the second storage unit.

Conveniently, the distributed architecture maintains two data structures indicative of write and revert operations as well as a third and a fourth data structures such as a forward data structure and a backward data structure. The forward data structure can be a forward bitmap and the backward data structure can be a reverse bitmap. Conveniently, a reverse bitmap and a forward bitmap are allocated per logical unit number (LUN) such as a disk, wherein an entry within each bitmap is associated with a data allocation unit such as a track.

It is noted that other associations between the bitmaps and logical (or physical) storage units and data allocation units can be provided without departing from the spirit of the invention. For example, a data allocation unit can have a fixed size, a variable size, can be larger than cache pages, smaller or equal than cache pages and the like.

Conveniently, a data allocation unit is larger than a cache page and the cache is aware of the association between pages and data allocation units. Conveniently, metadata (such as timestamps) is stored per data allocation unit. Stage and destage operations can be executed on storage memory portions that differ from data allocation units. The cache may support partial data allocation unit stage and destage operations.

Each bitmap contains an entry per data allocation unit. The forward bitmap assists in determining if a data version should be copied from the first storage unit to the second storage unit. The reverse bitmap indicates whether the most updated data version is stored in the first storage unit or in the second storage unit. The reverse bit map is usually used during revert operations. Revert operations can cause older data versions to be considered as the most updated data versions.

Conveniently, the cache can store only one version of data. When a new write request to a certain data allocation unit arrives the system can force the cache to perform a destage of the cached data version that is currently cached in that data allocation unit to one of the storage units. This operation is referred to as a forced destage. According to another embodiment of the invention only a subset of the cached data versions should be sent to a storage device, thus the system performs a forced destage only if there is a need to save that cached data version.

According to another embodiment the cache can store more than one version of data. Old versions may be destaged in order to free up cache space.

According to an embodiment of the invention a data storage policy is defined. This policy determines whether to send cached data version being cached within a data allocation unit to a storage unit, especially before writing a new data version to that data allocation unit. Conveniently, the data storage policy defines a data storage granularity. The data storage granularity sets the length of destage period that is represented by one (or none) destaged data version. If during a destage period multiple cached data versions are generated then only one of these multiple cached data versions is destaged in order to provide a destaged data version that represents the destage period. Usually the destaged data version is the last cached data version that is cached during that destage period.

According to an embodiment of the invention the multiple data storage granularities are defined. Typically, the data storage granularity gets coarser as the data versions get older. The data storage granularity can be responsive to events such as write operations, stage operations, destage operations and the like, and also to application generated events.

The data storage policy can define one or more relevancy windows. A data storage granularity can be fixed per each relevancy window, but this is not necessarily so.

The delay between each write operation and the destage operation, as well as the appliance of data storage policy reduces the number of destage operations.

Conveniently the proposed solution does not require an index scan and does not increase the size of the index or introduce additional user data transfers (also referred to as data I/Os).

Conveniently, cached data versions can be destaged either by performing forced destage operations or by scanning the data allocations of the cache (not necessarily in response to a request to write new data version) and locating cached data versions being stored in different cache data allocation units that were not destaged.

According to an embodiment of the invention data can be copied directly from a first storage unit to a second storage unit.

According to another embodiment of the invention data can be transferred between the first storage unit and the second storage unit via the cache. Thus, destaged data version is staged from the first storage unit to the cache and then destaged from the cache to the second storage unit to provide an older data version.

Conveniently, for both distributed and centralized architectures, reverting LUNs of a storage device requires no index scans, and avoids duplication of data and metadata, while introducing no additional user data I/O's to the system. In addition, older data versions are not lost.

It is noted that first write-back cache unit 131 can be connected to multiple interfaces, adapters and the like.

FIG. 1A illustrates system 100" for managing data, according to a further embodiment of the invention.

System 100" includes first write-back cache unit 131, second write-back cache unit 132, first non-volatile memory 141, second non-volatile memory 142, management unit 151, adaptor 143, first storage unit 121 and second storage unit 122.

System 100" includes two parts that are substantially mutually independent. One part backups the other part. Conveniently, each part has its own power supply unit, its own management unit and the like. For simplicity of explanation a single management unit 151 as well as a single adaptor 143 are shown, although they can also be duplicated.

The first part of system 100" includes first non-volatile memory 141, first write-back cache unit 131 and first storage unit 121. The second part of system 100" includes second non-volatile memory 142, second write-back cache unit 132 and second storage unit 122.

Management unit 151 is connected to first write-back cache unit 131, second write-back cache unit 132, first non-volatile memory 141 and second non-volatile memory 142. Adapter 143 is connected to first write-back cache unit 131, second write-back cache unit 132, first non-volatile memory 141 and second non-volatile memory 142.

First storage unit 121 is connected to first write-back cache unit 131 and to second write-back cache unit 132. Second storage unit 122 is connected to first write-back cache unit 131 and to second write-back cache unit 132.

Data that is sent to first write-back cache unit 131 is also sent to second non-volatile memory 142. Data that is sent to second write-back cache unit 132 is also sent to first non-volatile memory 141.

In addition, each of the first storage unit 121 and the second storage unit 122 can store data from first write-back cache unit 131 as well as from second write-back cache unit 132.

As mentioned above system 100" has two parts. For simplicity of explanation FIGS. 1A-1E illustrate write and read operations to the first part (especially to first write-back cache unit 131). Those of skill in the art will appreciate that read and write operations to the second part are executed in a symmetrical manner.

System 100" maintains four data structures: (i) first data structure 200 representative of write operations, (ii) second data structure 250 representative of revert operations, (iii) third data structure (also referred to as forward data structure) 260 indicative of which data to send from the first storage unit to a second storage unit and (iv) fourth data structure (also referred to as backward data structure) 270 that indicates whether a most updated version of data lies in first storage unit 121 or in second storage unit 122.

Each one of these data structures can be stored in various locations in system 100, for example all data structures 200, 250, 260 and 270 can be stored in second storage unit 122, but this is not necessarily so.

Third data structure 260 is updated when destage periods start and when data versions are copied from the first to second storage unit.

Conveniently, only one data version (per data allocation unit) is copied. In order to know whether a currently cached data version should be copied the first data structure can be scanned. In order to avoid this scan the third data structure 260 indicates if the currently cached data should be copied.

Conveniently, third data structure 260 includes bit per data allocation unit. The bit indicates if currently cached data version and a new data version (both associated with the same cache data allocation unit) belong to the same destage period. If the answer is positive the currently cached data version is not copied. A bit of the third data structure is set when the first caching operation occurs per a current destage period. At the end of that destage period the bit is reset.

Fourth data structure 270 is updated as a response to revert operation and stage and destage operation that follow the revert operation.

A revert operation required data to be sent from the second storage unit to the first storage unit. This process is time consuming and in order to allow the system to respond to data requests during this process the fourth data structure is used.

It is noted that after a revert operation (to a certain point in time) the most updated data versions correspond to that point in time. Accordingly they can be data versions that were regarded, before the revert operation to destaged data versions and to older data versions.

Fourth data structure 270 can include a bit per data allocation unit. If a revert operation is requested the bits can be set. Once data that is stored at a data allocation unit of the second storage unit is stored in the first storage unit the bit is reset.

Data can be cached in first write-back cache unit 131 and then destaged to first storage unit 121. Data from first storage unit 121 can be sent, via the first write-back cache unit 131 to the second storage unit 122. The first storage unit 121 stores staged (current) data versions while the second storage unit 122 stores older data versions. A revert can require to stage data from the first and/or the second storage units 121 and 122.

Management unit 151 is adapted to: (i) receive a request to write a new data version to a certain cache data allocation unit, (ii) determine, in response to a data storage policy, whether to overwrite a cached data version currently cached in the certain cache data allocation unit or to perform a destage of the cached data version to a first storage unit before writing the new data version to the certain cache data allocation unit; (iii) receive a request to read a data version that corresponds to a certain point in time and (iv) scan a first data structure representative of write operations and a second data structure representative of revert operation to determine a location of the requested data version. The first and second data structures are illustrated in FIG. 1K.

The management unit 151 controls the various components of system 100 to provide the requested data version and to selectively (in response to the management unit's determination) perform a forced destage.

Conveniently, first write-back cache unit 131 is not adapted to store multiple versions of the same data. Thus, before a new data version is cached the management unit 151 has to decide whether the cached data version should be saved in a data storage unit or not. The decision is responsive to the data storage policy.

According to another embodiment the first write-back cache unit 131 is adapted to store multiple versions of the same data.

System 100" and especially management unit 151 can control the operation of first write-back cache unit 131 by using intercepts.

System 100" can define, partially define, partially receive or receive a data storage policy that defines at least one data relevancy window. The relevancy window affects staging and destaging operations between first write-back cache unit 131 and first and second storage units 121 and 122.

One mechanism allows the first write-back cache unit to invoke intercepts at stage and destage time to scan a first data structure representative of write operations and a second data structure representative of revert operations to determine a location of the requested data version.

Figure 1B:
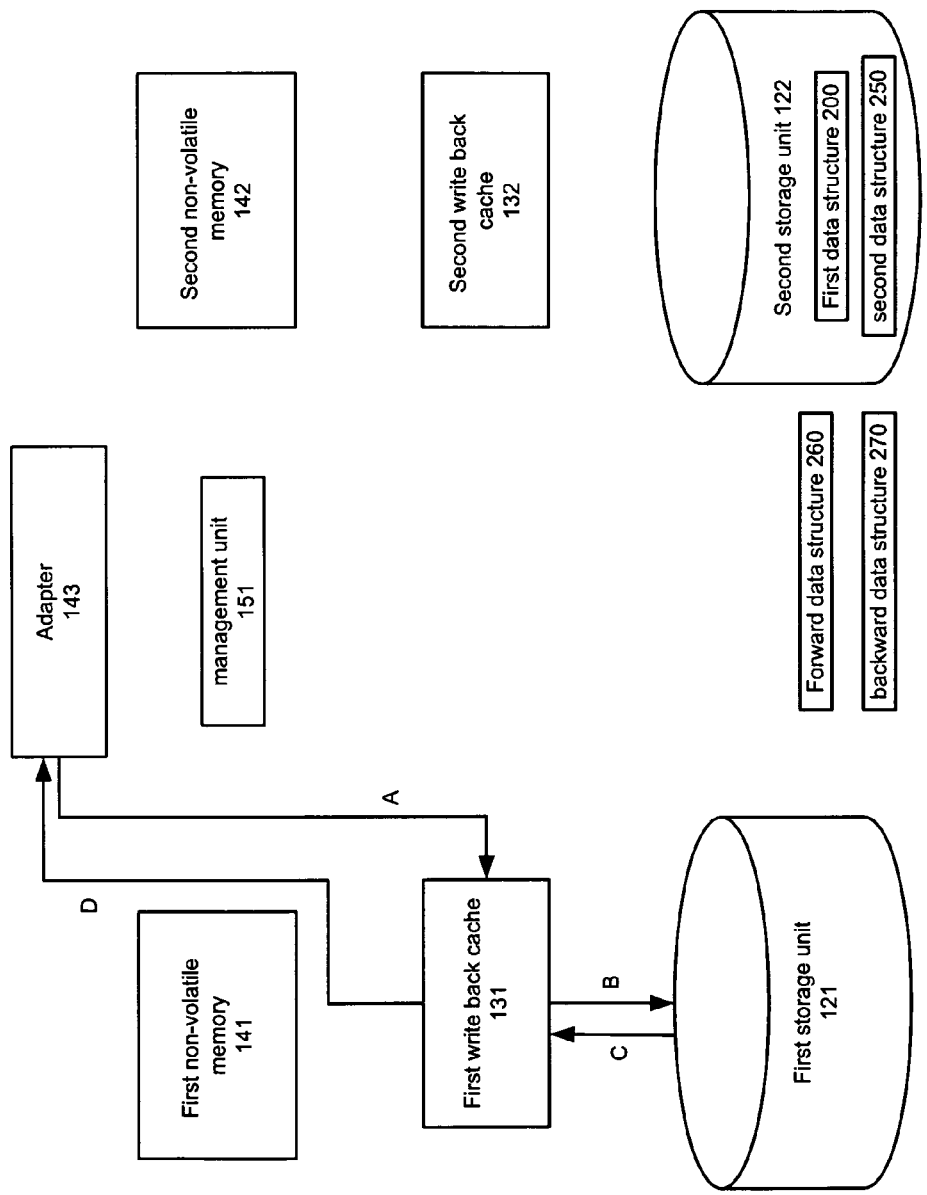
FIG. 1B illustrates an exemplary sequence of a write, read stage and destage operations, according to another embodiment of the invention.

FIG. 1B illustrates an exemplary sequence of a write, read stage and destage operations, according to another embodiment of the invention.

FIG. 1B illustrates a centralized architecture as first data storage unit 121 stores both destaged data versions and older data versions.

Figure 1C:
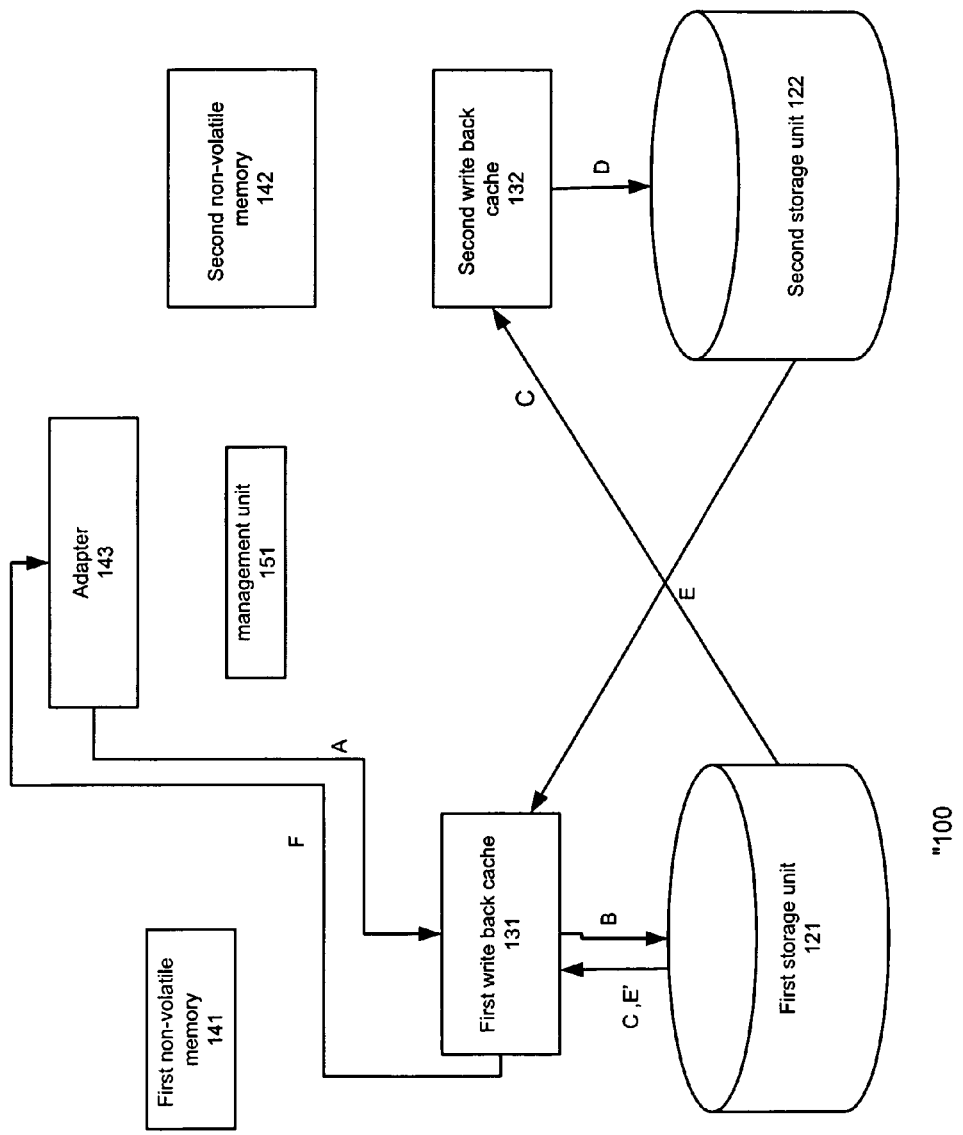
FIG. 1C illustrates an exemplary sequence of a write, read stage and destage operations, according to yet another embodiment of the invention.
Figure 1D:
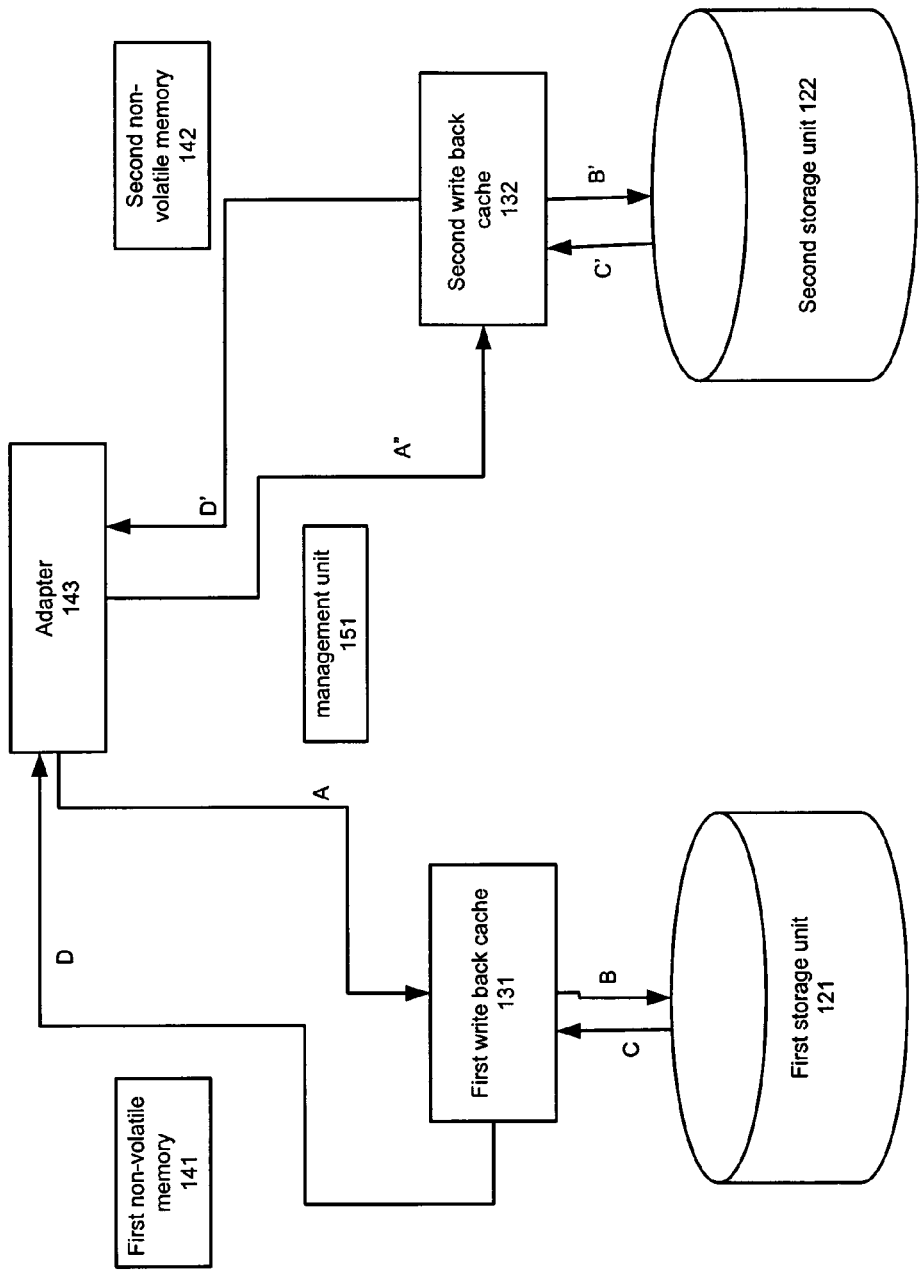
FIG. 1D illustrates an exemplary sequence of a write, read stage and destage operations, according to a further embodiment of the invention.

FIG. 1D illustrates an exemplary sequence of stage and a destage operations, according to an embodiment of the invention.

The sequence starts by a step of sending (illustrated by letter A), from adapter 143, a request to write a new data version to a certain cache data allocation unit of first write-back cache unit 131. If a cached data version that is currently cached in that certain cache allocation unit should be destaged (according to the data storage policy) then it is destaged to first data storage unit 121 (illustrated by letter B) to provide a destaged data version. After this destage step the new data version is cached at the certain cache data allocation unit.

The destaged data version can become an older data version, especially if a newer data version are cached and then destaged. The older data version are also stored in first data storage unit 121.

When a request to read a data version that corresponds to a certain point in time is received the requested data version is staged from first storage unit 121 (illustrated by letter C). The requested data version is then sent from first write-back cache unit 131 to adaptor 143.

FIG. 1C illustrates an exemplary sequence of a write, read stage and destage operations, according to yet another embodiment of the invention.

FIG. 1C illustrates a distributed architecture as first data storage unit 121 stores destaged data versions and second storage unit 122 stores older data versions.

FIG. 1C illustrates a sequence of operations that starts by a step of sending (illustrated by letter A), from adapter 143, a request to write a new data version to a certain cache data allocation unit of first write-back cache unit 131. If a cached data version that is currently cached in that certain cache allocation unit should be destaged (according to the data storage policy) then it is destaged to first data storage unit 121 (illustrated by letter B) to provide a destaged data version. After this destage step the new data version is cached at the certain cache data allocation unit.

The destaged data version can become an older data version, especially if a newer data version is cached and then destaged. Before it is overwritten, the older data version can be staged (illustrated by letter C) from first storage unit 121 to first write-back cache 131 and then destaged (illustrated by letter D) to second storage unit 122.

When a request to read a data version that corresponds to a certain point in time is received the requested data version can be staged from first storage unit 121 (illustrated by letter E) or from second storage unit 122 (illustrated by letter E'). The requested data version is then sent from first write-back cache unit 131 to adaptor 143.

FIG. 1D illustrates an exemplary sequence of write, read stage and destage operations, according to a further embodiment of the invention.

FIG. 1D illustrates a cache-level split architecture. A cache level split architecture system caches a new data version in both first and second write-back cache units 131 and 132. In the cache-level split architecture cached data versions are not sent from the first storage unit 121 (via a cache unit) to the second data storage unit 121. Cached data versions are sent from first write-back cache 131 to first storage unit 121 (illustrated by letter A) and are sent from second write-back cache unit 132 to second storage unit 122 (illustrated by letter A'). Older data versions are not stored in the first storage unit 121 but are stored in second storage unit 122. Second storage unit 122 receives and stores destaged data versions and older data versions.

Conveniently, destaged data versions are provided (illustrated by letter C) from first storage unit 121. Older data versions are provided (illustrated by letter C') from second storage unit. It is noted that destaged data versions can also be provided from second storage unit 122.

In the cache-level split architecture data is not sent from the first storage unit 121 to the second storage unit. Conveniently, if the data storage granularity is very fine the cache-level split architecture can save many stage and destage operations. On the other hand if the data storage granularity is low this architecture performs more destage operations that can be required in a non-split architecture.

Figure 1E:
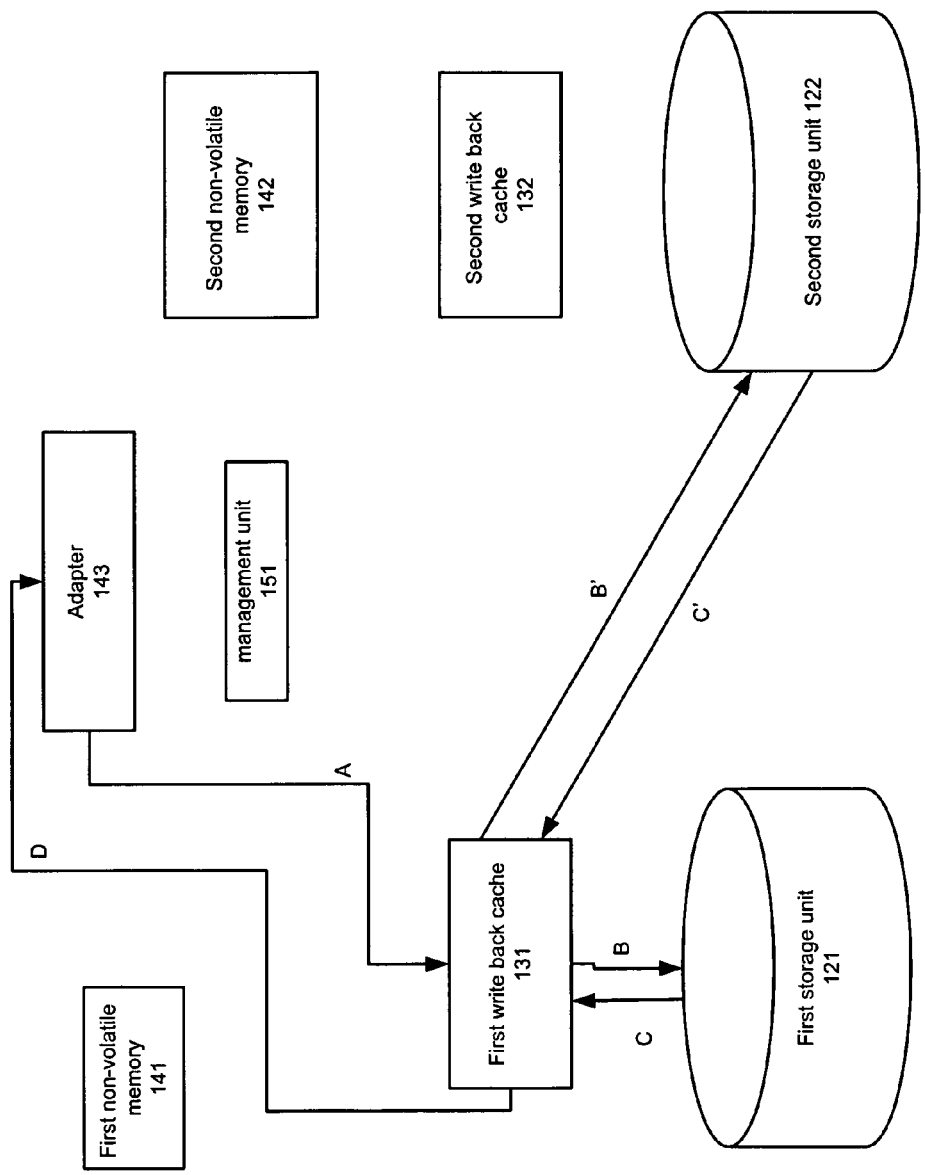
FIG. 1E illustrates an exemplary sequence of a write, read stage and destage operations, according to yet a further embodiment of the invention.

FIG. 1E illustrates an exemplary sequence of write, read stage and destage operations, according to a further embodiment of the invention.

FIG. 1E illustrates a storage unit level split architecture. A storage unit level split architecture system caches a new data version in a single write-back cache unit but sends a cached data version to first storage unit 121 (illustrated by letter B) and to second storage unit 122 (illustrated by letter B').

The first storage unit 121 does not store older data versions. Destaged data versions are provided to first write-back cache unit from the first storage unit 121 (illustrated by letter C).

Older data versions are stored in second storage unit 122 and can be later provided to first write-back cache unit (illustrated by letter C') 131 from first storage unit 121. It is noted that destaged data versions can also be provided from second storage unit 122.

In the storage unit level split architecture data is not sent from the first storage unit 121 to the second storage unit. Conveniently, if the data storage granularity is very fine the storage unit level split architecture can save many stages and destages.

According to another embodiment of the invention system 100" can also apply a selective storage unit level split architecture. Accordingly, system 100" can decide, before destaging a cached data version, whether to send that data version to the first storage unit or to both the first and second storage units 121 and 122.

Conveniently, if the system can determine that a cached data version is the last cached data version to be cached during a lapsed destage period then this cached data version can be sent to the first storage unit and to the second storage unit. If a cached data version should be destaged at the middle of a destage period or at the beginning of that destage period it can be destaged to the first storage unit 121.

It is noted that the cached data version can be sent to both data storage units in response to a lapse of a predefined destage period portion.

The selective storage unit split architecture acts substantially as a distributed architecture at coarse data storage granularities and acts substantially as a storage unit level split architecture at fine data storage granularities.

It is noted that although FIGS. 1A-1E illustrate a second write back cache and a second non-volatile memory and assume that the current data versions and older data versions are stored on distinct caches and non volatile memories, this is not necessarily the case. Accordingly, system 100" can operate substantially at the same manner even if current data versions and older data versions reside in the same cache and non volatile memory.

Figure 1F:
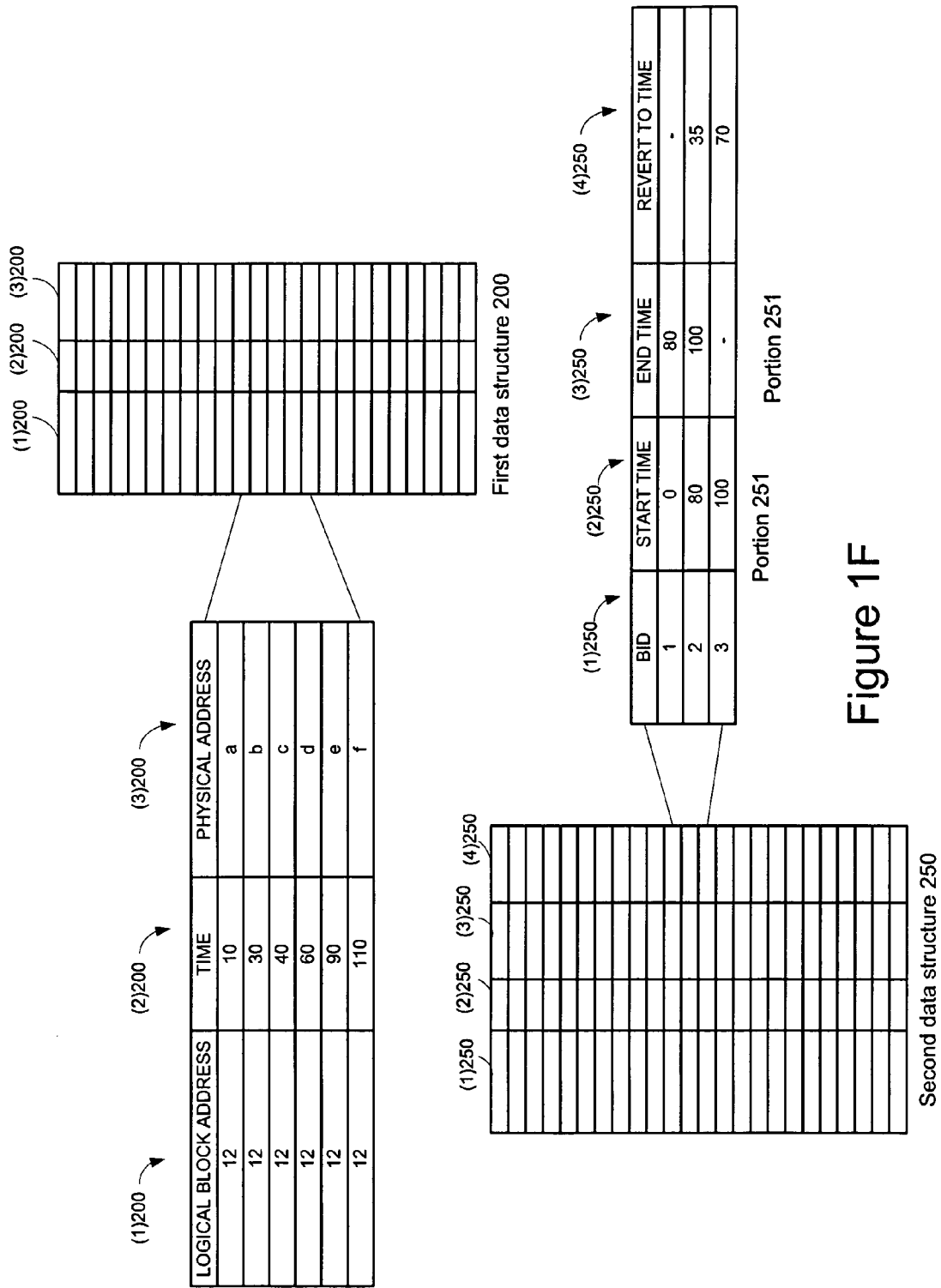
FIG. 1F illustrates two portions of a first data structure and a second data structure, according to an embodiment of the invention.

FIG. 1F illustrates two portions 201 and 251 of a first data structure and a second data structure, 200 and 250, respectively, according to an embodiment of the invention. In this example the key is an LBA together with a timestamp and the data is a physical address. However other examples could be used. For simplicity of explanation these figures illustrate read and revert operations to the same logical block address (for example LBA=12).

It is noted that the first data structure 200 includes metadata relating to write operations to other LBAs.

It is also noted that portion 201 is illustrated as representing update operations to a certain LBA but it can also represent operations relating to other LBAs. Alternatively, other graphs can represent operations relating to other LBAs.

The first data structure 200 includes three columns 200(1), 200(2) and 200(3). Each entry includes information about a write operation. The first column 200(1) includes the logical block address of the write operation, the second column 200(2) includes the write timestamp, and the third column 200(3) includes the physical address of the write operation. The logical block address and the time of write fields can be used as a key (index) to the first data structure 200(1).

It is noted that if at a certain point in time a write operation to multiple LBAs occurs then the first table will include multiple entries that reflect this write operation.

The second data structure 250 includes four columns 250(1)-250(4). The first column 250(1) includes branch identifiers, the second column 250(2) includes branch start times, the third column 250(3) includes branch end times and the fourth column 250(4) includes the revert-to-time of each branch.

Data structures 200 and 250 are adapted to control a sequence of write and revert operations in which one branch is active at each given point in time. In order to support multiple concurrent active branches these tables should be modified to include branch identification information.

FIG. 2 illustrates an exemplary sequence 101 of write and revert operations according to an embodiment of the invention. Sequence 101 includes write operations to a virtual address space such as a logical unit (LUN) at times 10, 30, 40, 60, 90 and 110, and requests (received at times 80 and 100) to revert the content of the LUN at times 35 and 70 accordingly.

Dashed lines represent the revert operation. It is noted that only one branch is active at any given point in time.

It is assumed that the write operations were associated with logical block address 12 and that the physical addresses associated with these write operations were a, b, C, d, e and f accordingly.

The first column 200(1) of the first data structure 200 indicates that the write operations were to logical block address 12. The second column 200(2) of the first data structure 200 indicates that the write operations occurred at times 10, 30, 40, 60, 90 and 110. The third column 200(3) of the first data structure 200 indicates that the physical addresses associated with these write operations were a, b, c, d, e and f.

The first entry of the second data structure 250 indicates that a first branch started at time 0 and ended at time 80. The first branch ended when a first request to revert the content of a LUN was accepted.

The second entry of the second data structure 250 indicates that a second branch started at time 80 and ended at time 100. The second branch ended when a second request to revert the content of a LUN was accepted.

The third entry of the second data structure 250 indicates that a third branch started at time 100 and did not end.

According to another embodiment of the invention the second data structure includes additional metadata such as branch statistics. Branch statistics can include, for example, the number of first data structure entries that belong to the branch, the number of different logical block addresses that were written during the duration of the branch, and the like. Conveniently, the branch statistics can assist in determining which branches to delete, especially when there are frequent read and write operations.

Figure 3:
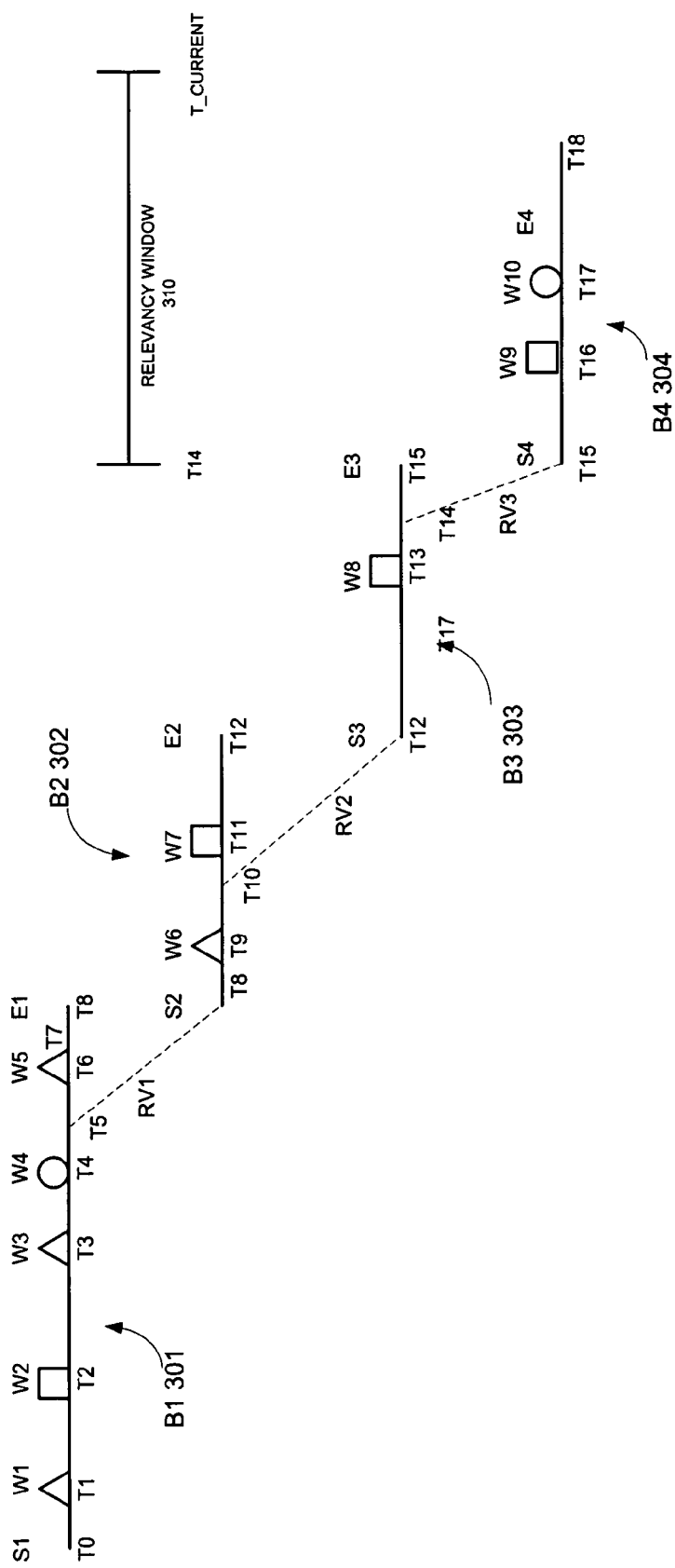
FIG. 3 illustrates an exemplary sequence of write and revert operations according to an embodiment of the invention.

FIG. 3 illustrates an exemplary sequence 300 of write and revert operations according to an embodiment of the invention.

Write operations (W1, W3, W5 and W6) to a first LBA are illustrated by triangles. Write operations (W4 and W10) to a second LBA are illustrated by circles. Write operations (W2, W7 and W9) to a third LBA are illustrated by boxes.

Sequence 300 includes four branches B1-B4 301-304 and defines a relevancy window 310 that spans between T14 and a current point in time (T_CURRENT).

The first branch (B1) starts (S1) at T0 and ends (E1) at T8. First branch B1 includes the following write operations: W1 (to first LBA) at T1, W2 (to third LBA) at T2, W3 (to first LBA) at T3, W4 (to second LBA) at T4, and W5 (to first LBA) at T6. B1 ends (E1) at T8.

The second branch (B2) 302 is a child of B1 301 and starts (S2) at time T8 by a revert operation (RV1) to time T5. Second branch B2 302 includes the following write operations: W6 (to first LBA) at T9 and W7 (to third LBA) at T11. B2 ends (E2) at T12.

The third branch (B3) 303 is a child of B2 302 and starts (S3) at time T12 by a revert operation (RV2) to time T10. The third branch B3 303 includes a single write operation that is W8 (to third LBA) at T13. B3 ends (E3) at T15.

The fourth branch (B4) 304 is a child of B3 303 and starts (S4) at time T15 by a revert operation (RV3) to time T14. B4 304 includes a write operation W9 (to third LBA) at T16 and another write operation W10 (to second LBA) at T17. The fourth branch B4 304 ends (E4) at T18.

Figure 4:
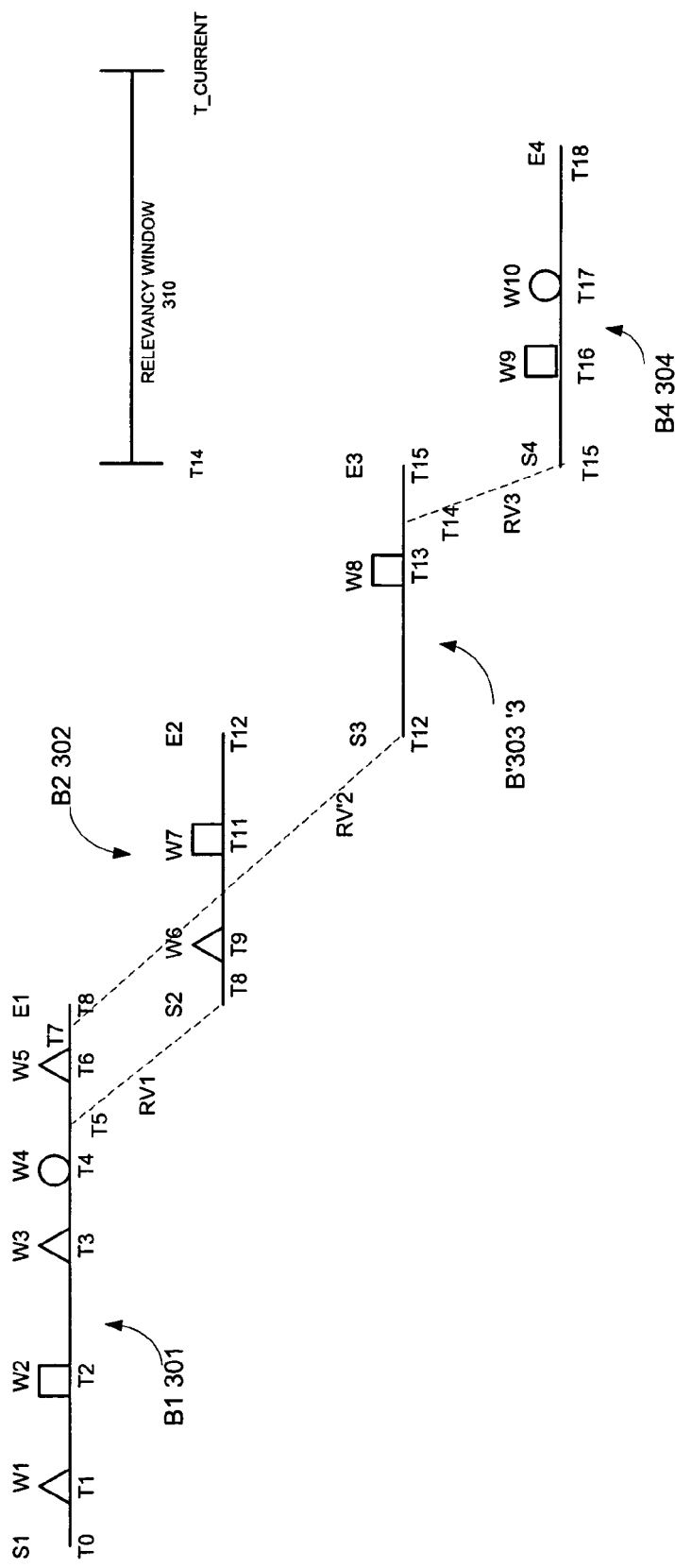
FIG. 4 illustrates an exemplary sequence of write and revert operations according to another embodiment of the invention.

FIG. 4 illustrates an exemplary sequence 300' of write and revert operations according to another embodiment of the invention.

Sequence 300' differs from sequence 300 by the time to revert of the second revert operation (RV2'). The revert-to-time is T7 (that belongs to first branch B1 301) and not T10 (that belongs to second branch B2 302). Thus, the second branch B2 302 that had a child branch (B3 303) in sequence 300 does not have a child in sequence 300'.

Figure 5:
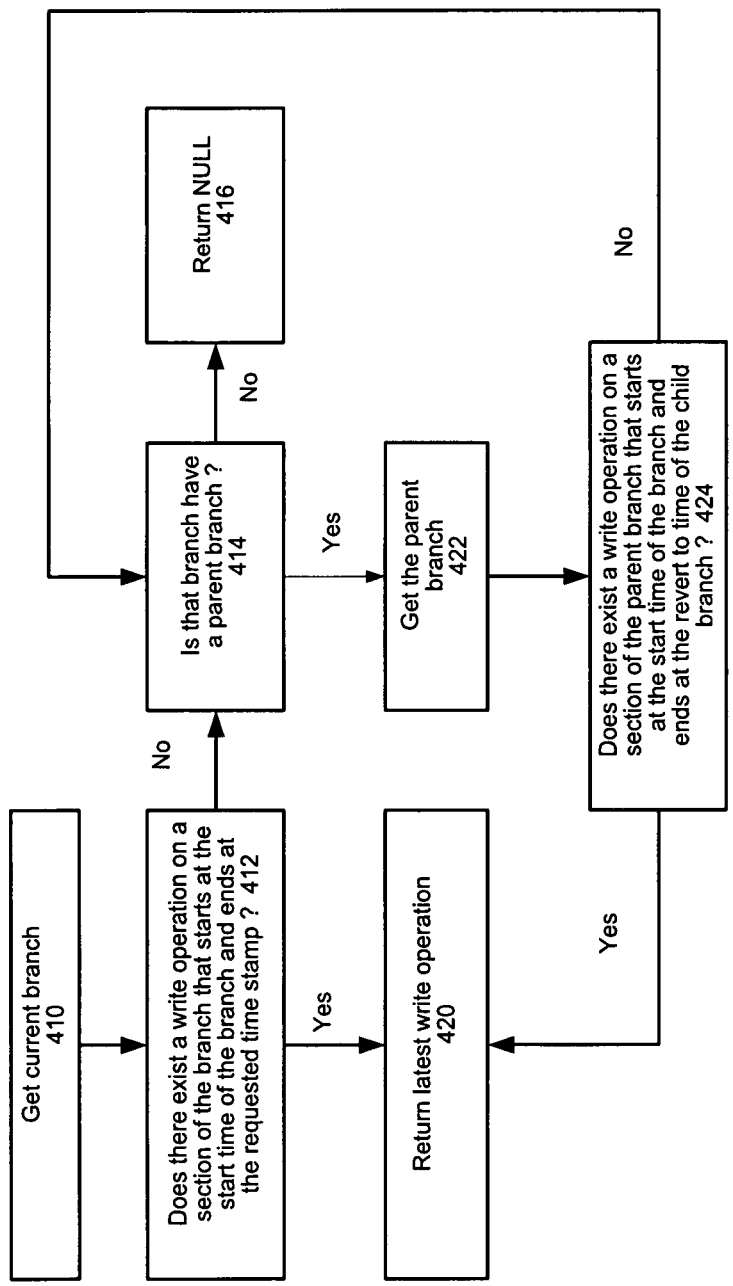
FIG. 5 illustrates a method for retrieving a data version, according to an embodiment of the invention.

FIG. 5 illustrates a method 400 for retrieving a data version, according to an embodiment of the invention.

Method 400 starts by stage 410 of selecting or getting a current branch. Stage 410 is followed by stage 412 of checking if there exists a write operation on a section of that branch that starts at the start of the branch and ends at the requested time stamp associated with the retrieval request of the data version. If the answer is negative stage 412 is followed by stage 414, else stage 412 is followed by stage 420.

Stage 420 includes returning the latest write operation as the outcome of method 400.

Stage 414 includes checking if the branch has a parent branch. If the answer is negative method 400 ends by stage 416 of returning a negative answer (Null). If the answer is positive than stage 414 is followed by stage 414 of getting the branch parent and stage 424 of checking if there exists a write operation on a section of that parent branch that starts at the start of the branch and ends at a revert to time associated with the child branch of the examined parent branch. If the answer is negative stage 424 is followed by stage 414, else stage 424 is followed by stage 420.

Figure 6:
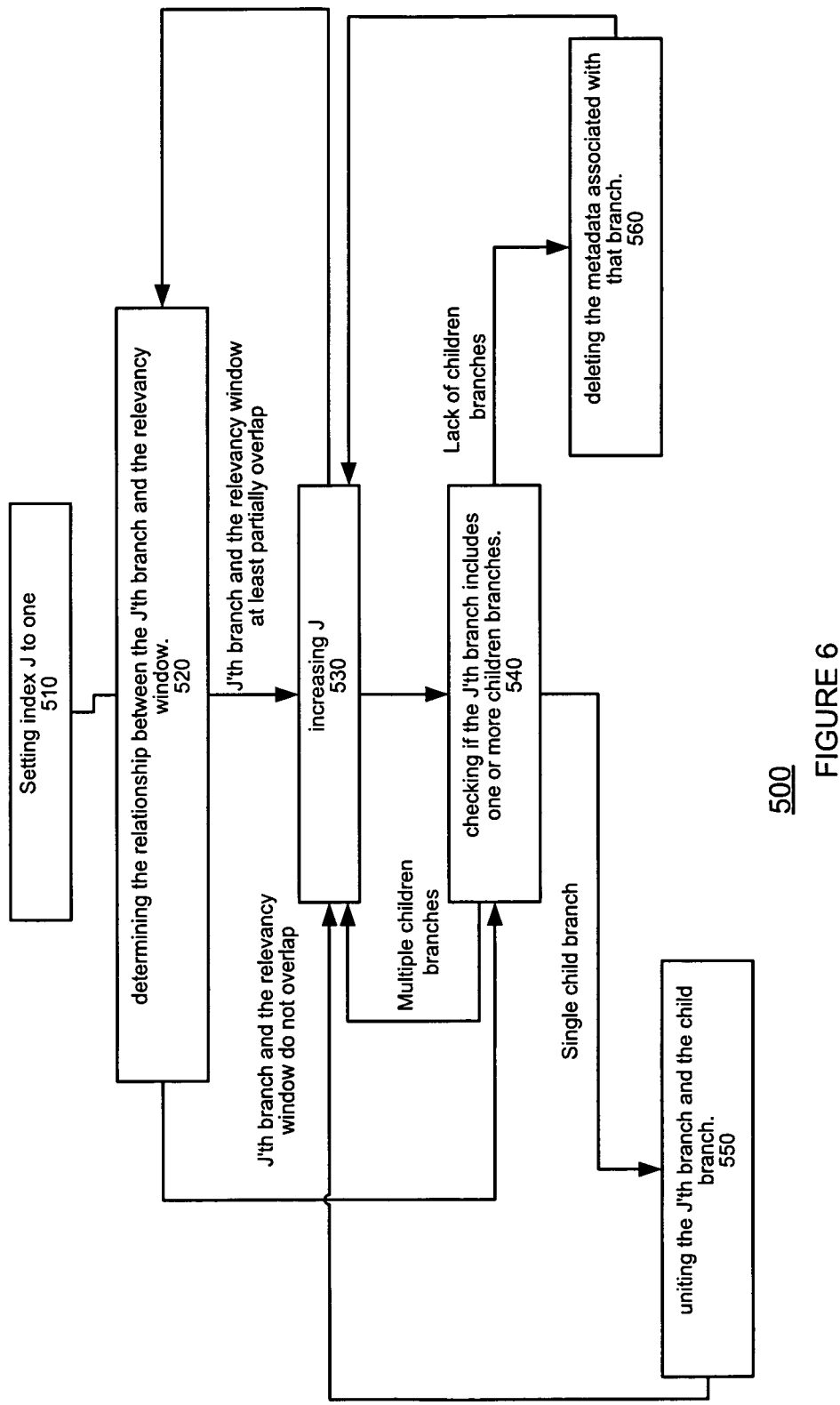
FIG. 6 illustrates a coarse analysis according to an embodiment of the invention.

FIG. 6 illustrates a coarse analysis according to an embodiment of the invention.

The coarse analysis 500 starts by stage 510 of setting a branch index (J) to one.

Stage 510 is followed by stage 520 of determining the relationship between the J'th branch and the relevancy window.

If the J'th branch and the relevancy window at least partially overlap then the J'th branch is not deleted and stage 520 is followed by stage 530 of increasing J and jumping to stage 520. It is noted that this iteration ends when the whole second data structure is scanned.

If the J'th branch and the relevancy window do not overlap (even not partially overlap) then stage 520 is followed by stage 540 of checking if the J'th branch includes one or more children branches.

If the J'th branch has a single branch child then stage 540 is followed by stage 550 of uniting the J'th branch and the child branch. According to an embodiment of the invention stage 550 includes marking the branch as a branch that should be united (for example, by moving the last entry before the revert-to-time of the child branch to the start time of the child branch).

If the J'th branch is outside the relevancy window and does not have any children then stage 550 is followed by stage 560 of deleting the metadata associated with that branch. According to an embodiment of the invention stage 560 includes marking the branch as a branch that should be deleted. The deletion can be made during the execution of the fine analysis.

If there are multiple children branches then stage 540 is followed by stage 530.

Stages 560 and 550 are followed by stage 530.

For example, referring to FIG. 3, the fourth branch B4 304 is within the relevancy window and the first till third branches are ancestors of the fourth branch. Accordingly, no branch is deleted.

Yet for another example, referring to FIG. 4, second branch B2 302 is not a ancestor of the fourth branch B4 304 and is outside the relevancy window, thus it can be deleted.

It is noted that the deletion can include marking the branch as a candidate for deletion, performing a fine analysis that is responsive to such a mark, and just then deleting the branch.

Figure 7A:
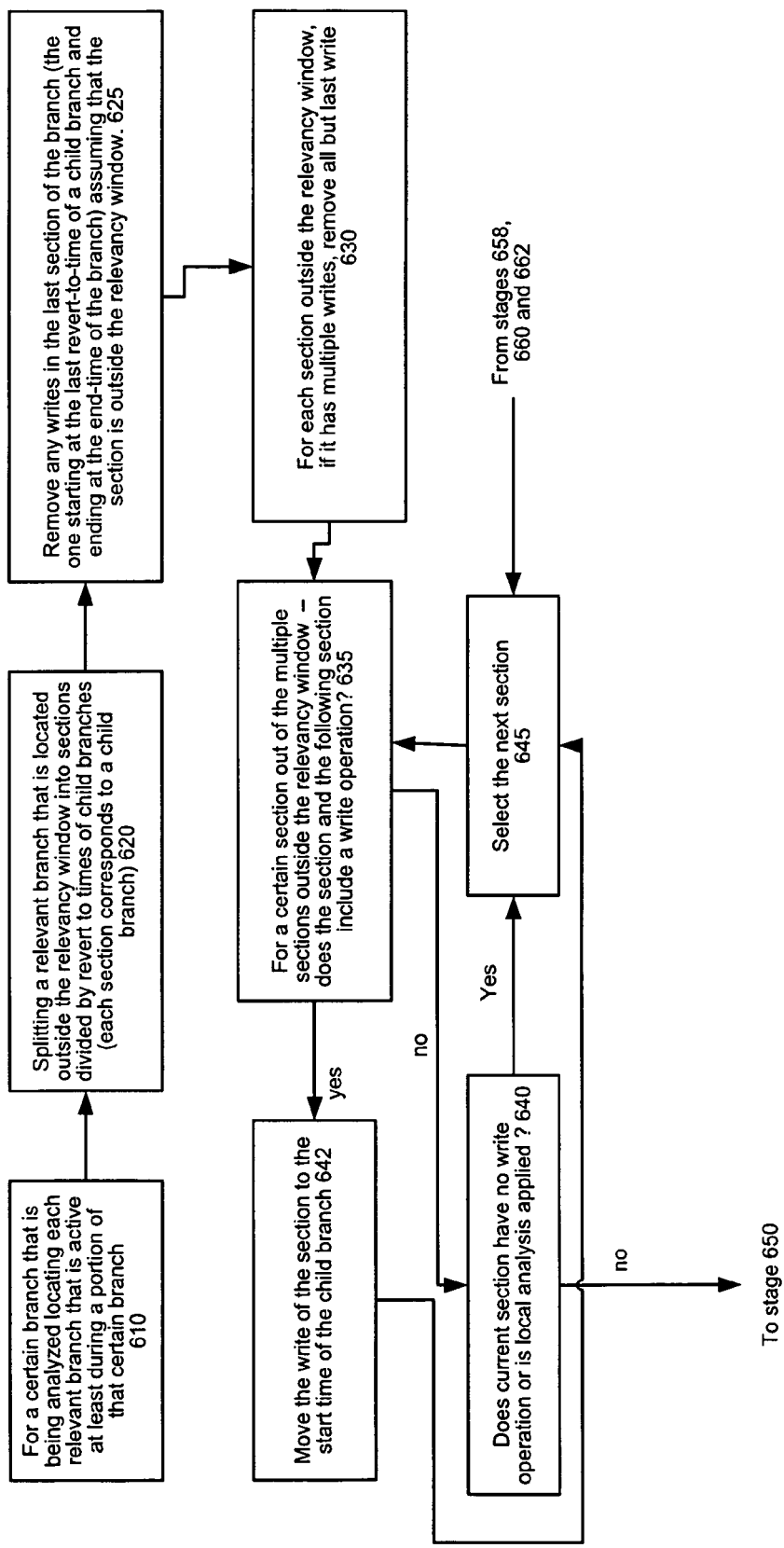
FIGS. 7a and 7b illustrate a global fine analysis according to an embodiment of the invention.
Figure 7B:
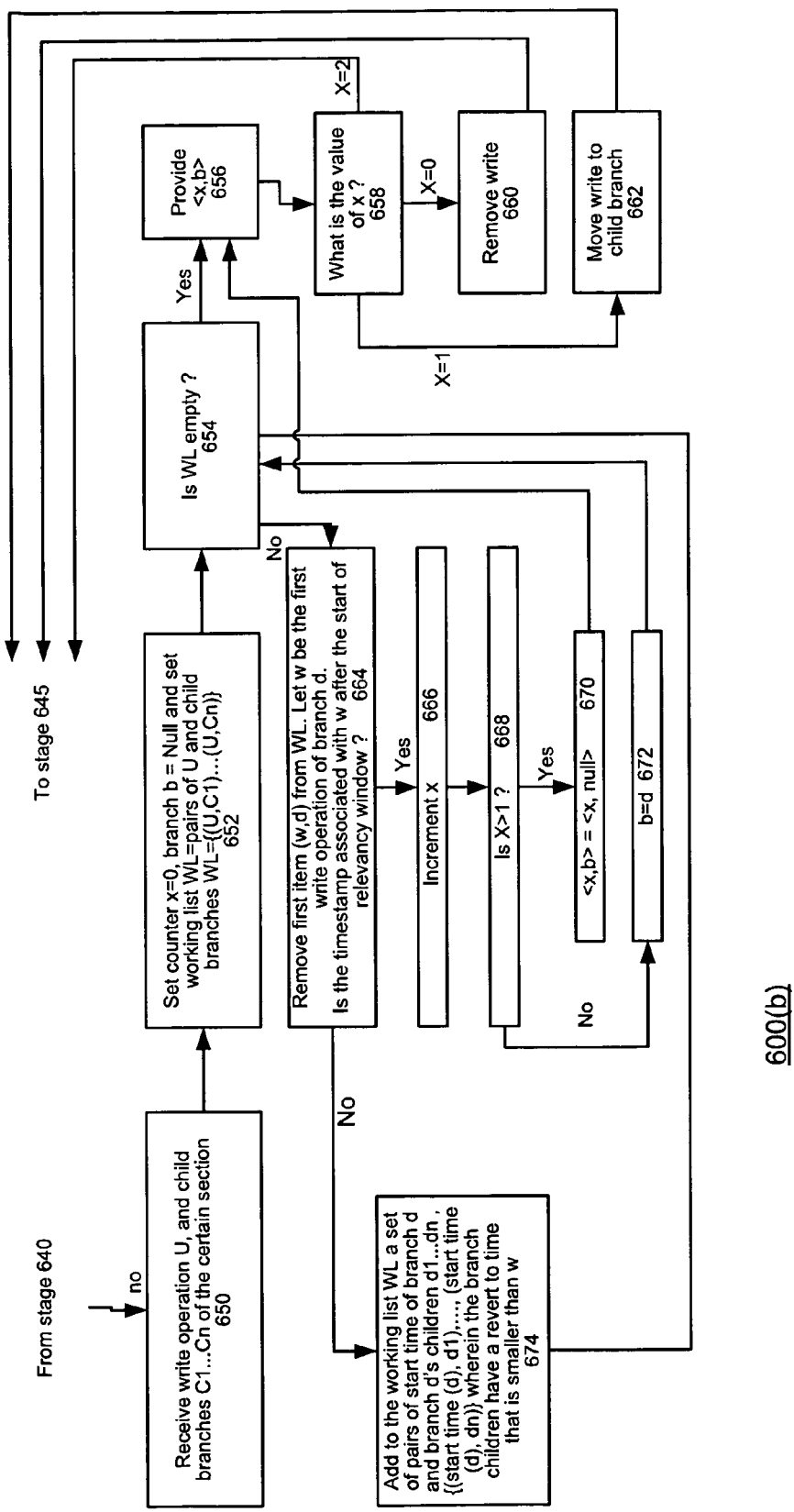

FIGS. 7a-7b illustrates a global fine analysis 600 according to an embodiment of the invention.

FIG. 7a illustrates a first portion 600(a) of analysis 600 while FIG. 7b illustrates portion 600(b) of analysis 600.

The global fine analysis is executed for a certain branch. It can then be executed for another branch. The global fine analysis 600 starts by stage 610 of locating each branch that is active at least during a portion of that certain branch. Each such branch is referred to as relevant branch.

Stage 610 is followed by stage 620 of splitting a relevant branch located outside the relevancy window to sections divided by revert to times of child branches. Each section is associated with a child branch.

Stage 620 is followed by stage 625 of removing any write operations in the last section of the branch (the section that starts at the last revert to time of a child branch and ending at the end time of the branch) assuming that the section is outside the relevancy window.

Stage 625 is followed by stage 630 of removing all write operations (except of the last write) of a section (outside the relevancy window) if it has multiple writes.

Stage 630 is followed by stage 635 of determining, for a certain section out of the multiple sections, does the section and the following section include a write operation. If the answer is positive then stage 635 is followed by stage 642 of moving the write section to the start time of the child branch. If the answer is negative then stage 635 is followed by stage 640 of determining whether the current section have no write operation or is local fine analysis is applied. If the answer is yes then stage 640 is followed by stage 650, else it is followed by stage 645 of selecting the next section out of the multiple sections and jumping to stage 635.

Stage 650 includes receiving a certain write operation U and child branches C1 ... Cn of the certain section. Stage 650 is followed by stage 652 of setting counter X to zero, setting branch b to null and defining (or setting) a working list WL to be equal a pair of write operation U and the child branches: WL={(U,C1), ..., (U,Cn)}.

Stage 652 is followed by stage 654 of determining if WL is empty. If the answer is positive stage 654 is followed by stage 656, if the answer is negative stage 654 is followed by stages 664.

Stage 656 includes providing <x,b>. Stage 656 is followed by stage 658 of checking the value of x. If x=0 then stage 658 is followed by stage 660 or removing a write operation. Stage 660 is followed by stage 645. If x=1 stage 658 is followed by stage 662 of moving the write operation to a child branch. If x=2 stage 658 is followed by stage 645. Stage 662 is followed by stage 645.

Stage 664 includes removing the first item (referred to as (w,d) from WL and checking if the first write operation in branch d occurred after the beginning of the relevancy window. If the answer is negative stage 664 is followed by stage 674, else it is followed by stage 666. Stage 666 includes increasing x and it is followed by stage 668 of checking if x is greater than one. If x zero or one stage 668 is followed by stage 670 of setting <x,b> to <x,null> and jumping to stage 656. If x>1 then stage 668 is followed by stage 672 of setting b to 2 and jumping to stage 654.

Stage 674 includes adding to the working list a set of pairs of start time of branch d and branch d's children that have a revert to time that is smaller than the time of w. WL={(start time(d) . . . d1), (start time(d), dn)}. Stage 674 is followed by stage 654.

It is noted that most of the mentioned above examples referred to a scenarios in which only one active branch exists per any point in time. As mentioned above this is not necessarily so. In order to support multiple coexisting branches additional metadata is required for selecting between multiple co-existing branches. This additional metadata can include branch identifier, parent branch identifier and the like.

Multiple branches can co-exist in various scenarios such as but not limited to testing environments, an implementation of host addressable logical units that support many snapshots, and the like.

It is noted that if multiple branches co-exist then the addition of a new branch (for example by performing a revert operation) does not necessarily terminate another branch. According to an embodiment of the invention a third data structure is defined.

The third data structure includes the first write operation to each LBA. Such a table can simplify various scanning sequences. Yet for another example, another data structure that includes the last write operation per branch can also be defined. According to another embodiment of the invention the B-Tree is replaced by a prefix B-tree.

An alternative solution is to make B-Tree entries be only the logical-track-number, without a time component, and to store in the tree leaves a variable-length structure with all the LBA entries and their time information.

Figure 8:
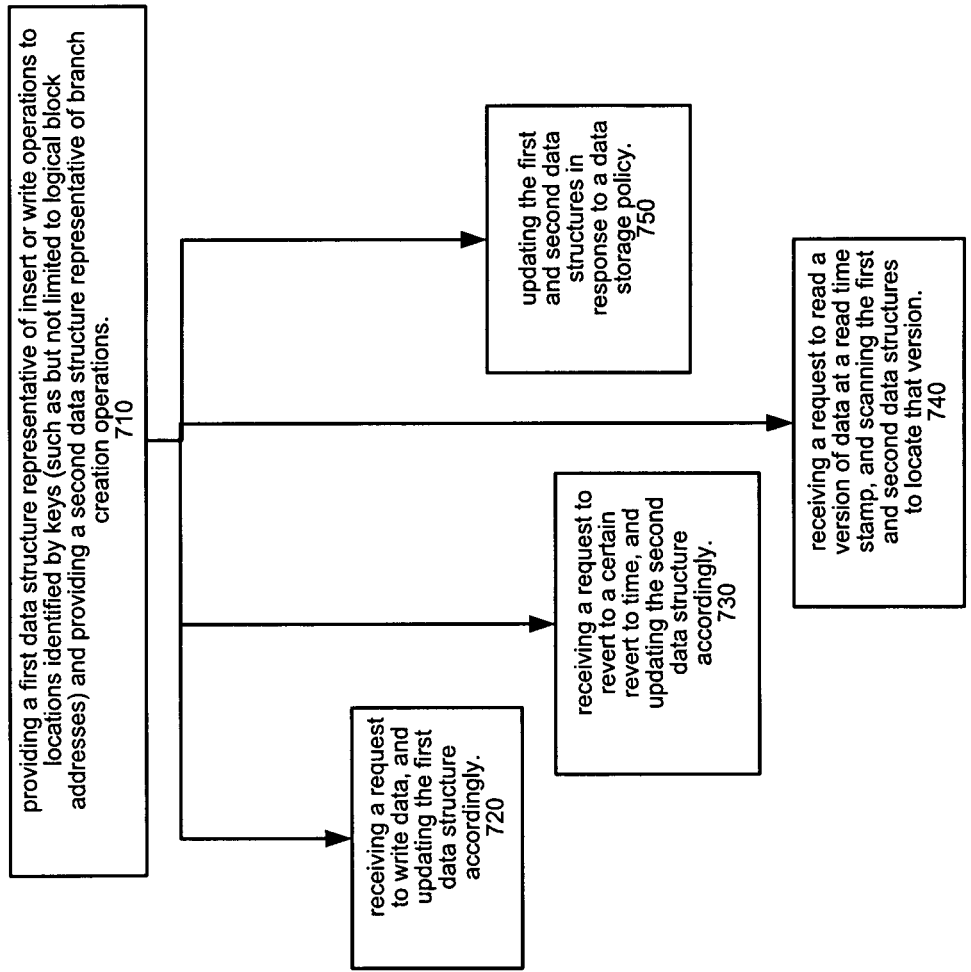
FIG. 8 illustrates a method for managing data, according to an embodiment of the invention.

FIG. 8 illustrates method 700 for managing data, according to an embodiment of the invention.

Method 700 starts by stage 710 of providing a first data structure representative of write operations to information identified by a key such as but not limited to a logical block addresses and providing a second data structure representative of branch creation operations such as but not limited to revert operations, branch cloning operation and the like. Conveniently, the first data structure includes a write timestamp and a mapping between a logical block address and an associated physical address. Conveniently, the second data structure includes branch identifiers, branch start time, branch end time and branch revert to time. Conveniently the first data structure is a B-Tree.

Stage 710 is followed by stages 720, 730, 740 and 750.

Stage 720 includes receiving a request to write or update data, and updating the first data structure accordingly.

Stage 730 includes receiving a request to create a branch that starts by a version of data at a requested timestamp, and updating the second data structure accordingly. For example, the request to create a branch can be a result of a request to revert the data to a certain revert-to-time (and the revert-to-time is regarded as the requested time). Yet for another example, the request to create a branch can be a result of a request to logically duplicate (clone) the data and in this case the time of the request is the requested time.

Stage 740 includes receiving a request to read a version of data at a read time stamp, and scanning the first and second data structures to locate that version. Stage 740 can include one or more stages of method 400.

Stage 750 includes updating the first and second data structures in response to a data storage policy. Stage 750 can include performing a coarse analysis, performing a fine analysis and the like. Stage 750 can include one or more stages illustrated in FIGS. 6 and 7.

Figure 9A:
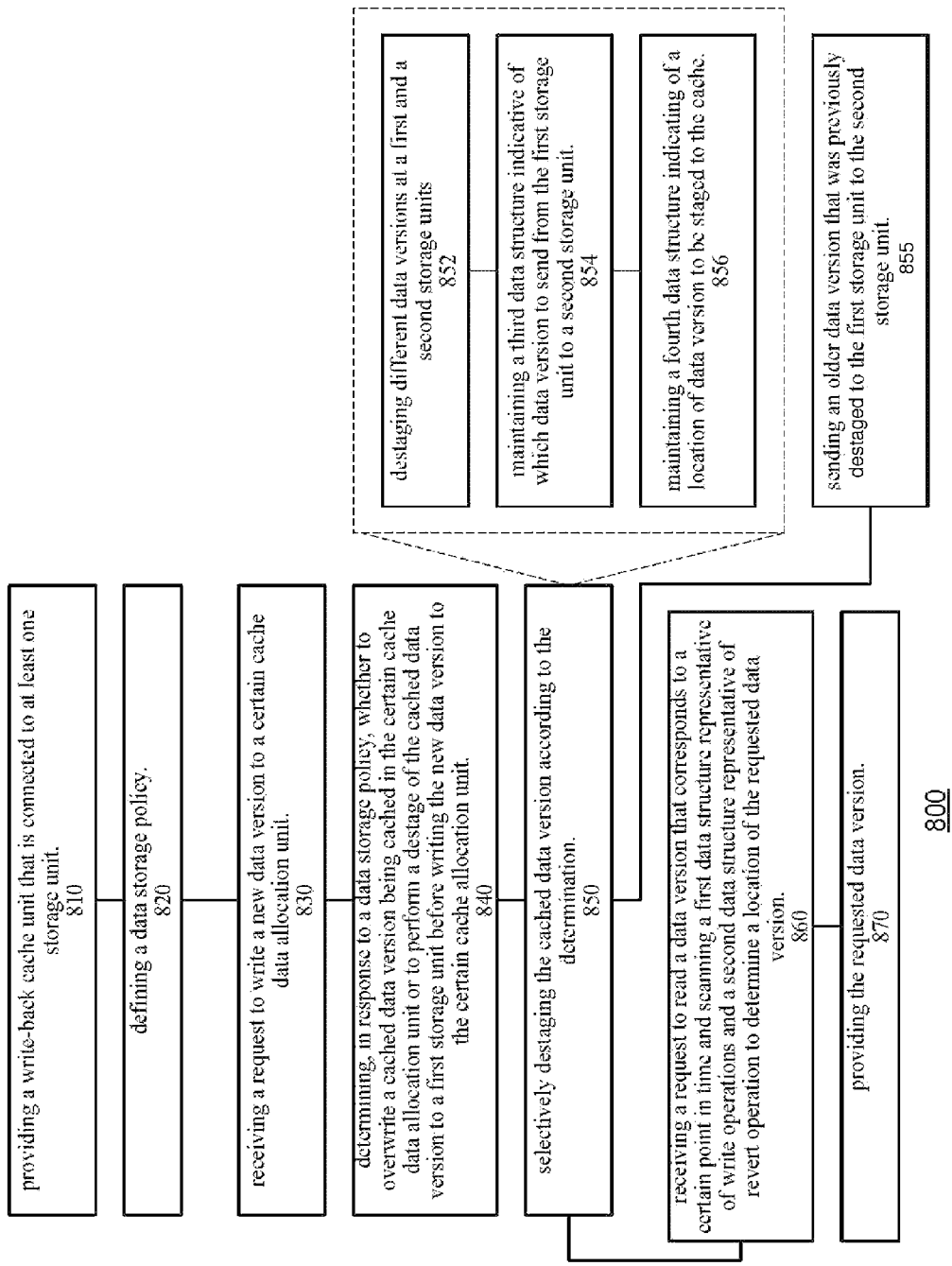
FIG. 9A illustrates a method for managing data, according to another embodiment of the invention.

FIG. 9A illustrates method 800 for managing data, according to another embodiment of the invention.

Method 800 starts by step 810 of providing a write-back cache unit that is connected to at least one storage unit.

Step 810 is followed by step 820 of defining a data storage policy. The data storage policy can define one or more relevancy windows, defining one or more data granularity periods. This definition affects stage and destage decisions.

Step 820 is followed by step 830 of receiving a request to write a new data version to a certain data allocation unit.

Step 830 is followed by step 840 of determining, in response to a data storage policy, whether to overwrite a cached data version being cached in the certain cache data allocation unit or to perform a destage of the cached data version to a first storage unit before writing the new data version to the certain cache allocation unit or whether to maintain multiple cached data versions. Conveniently, the data storage policy defines a destage period that is represented by a single destaged data version (per cache data allocation unit). If that period expired the latest cached data version can be destaged. If the new data version and the currently cached data version are sent to the cache during the same destage period then the currently cached data version can be overwritten without destaging it.

Step 840 is followed by step 850 of selectively destaging the cached data version according to the determination.

Conveniently, step 850 can be applied in various architectures including distributed architecture, centralized architecture, storage unit level split architecture and selective storage unit level split architecture.

Conveniently, step 850 includes step 852 of destaging different data versions at a first and a second storage units and step 854 of maintaining a third data structure indicative of which data version to send from the first storage unit to a second storage unit.

Conveniently, step 860 includes step 856 of maintaining a fourth data structure indicating of a location of data version to be staged to the cache.

Conveniently, step 850 includes utilizing intercepts to provide the requested data version.

Conveniently, step 850 includes destaging a cached data version to a first storage unit to provide a destaged data version.

According to an embodiment of the invention step 850 is followed by step 855 of sending an older data version that was previously destaged to the first storage unit to the second storage unit.

Conveniently, step 855 includes generating a dummy entry that includes a timing of the sending of the older data version. The dummy entry is a part of the first data structure.

Conveniently, step 855 includes staging the older data version to a write-back cache unit and destaging the older data version from the write-back cache unit to the second storage unit.

Stage 850 may be followed by stage 860 of receiving a request to read a data version that corresponds to a certain point in time and scanning a first data structure representative of write operations and a second data structure representative of revert operation to determine a location of the requested data version.

Conveniently, step 860 includes maintaining a backward data structure that indicates whether requested data versions are stored in the first storage unit of the second storage unit.

Conveniently, step 860 includes step 856 of maintaining a fourth data structure indicating of a location of data version to be staged to the cache.

Stage 860 is followed by stage 870 of providing the requested data version. Conveniently, stage 870 includes providing a requested data version from the non-volatile memory unit if a data storage unit failed.

According to an embodiment of the invention step 840 includes storing the new data version at a non-volatile memory unit.

FIG. 9B illustrates a method 900 for managing data according to a further embodiment of the invention.

Method 900 starts by step 910 of providing a first cache unit, a second cache unit, a first storage unit and a second storage unit.

Step 910 is followed by step 920 of defining a data storage policy. The data storage policy can define one or more relevancy windows, defining one or more data granularity periods. This definition affects stage and destage decisions. The architecture defines how data versions are cached (to one or two cache units), and destaged (to one or more data storage units). The destaging to one or more data storage units can be fixed or can dynamically change. A fixed destage policy is represented by the storage unit level split architecture and by the cache level spilt architecture. A dynamic destage policy is represented by the selective storage unit split policy.

It is noted that FIG. 9B illustrates a sequence of steps that include a reception of a request to write a new data version and then a reception of a request to read a data version. It is noted that the order of these requests can change and accordingly the order of various stages of method 900 can change accordingly.

Step 920 is followed by step 930 of receiving a request to write a new data version to a certain cache data allocation unit of the first cache unit.

Step 930 is followed by step 940 of caching the new data version at the certain cache data allocation unit and destaging, in response to the data storage policy, a cached data version currently stored in the certain cache data allocation unit to the first and second storage units.

If, for example, the new data version is cached in the first and the second cache units then the destaging includes destaging the cached data version from the first cache unit to the first data storage unit and destaging the cached data version from the second cache unit to the second data storage unit.

Step 940 is followed by step 950 of receiving a request to read a data version that corresponds to a certain point in time and providing the requested data version.

Conveniently, step 950 includes providing destaged data versions from the first storage unit and providing older data versions from the second data unit.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

According to an embodiment of the invention data is written to a write-back cache unit, and current as well and previous data versions are sent to one or more storage units such as disks, disk arrays, tapes and the like. The data storage policy helps to refresh the data as well as the metadata and also assists in determining whether to send a certain data version to the disk or not.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for managing data, the method comprising:
receiving, by a management unit coupled to a write-back cache, a request from an adapter to write a new version of a data set to a certain cache data allocation unit of the write-back cache unit, wherein the write-back cache is situated separate from the management unit, the certain cache data allocation unit comprising a current version of the data set, and wherein the new version of the data set is received from the adapter;

analyzing, by the management unit based on receiving the request to write the new version of the data set, a data storage policy, the data storage policy indicating at least when the current version of the data set is to be overwritten and when the current version of the data set is to be destaged;

destaging, based on the data storage policy that has been analyzed, the current version of the data set from the certain cache data allocation unit to a first storage unit; and writing, by the management unit based on the destaging, the new version of the data set received from the adapter to the certain cache allocation unit.

2. The method of claim 1, further comprising:
receiving a request to read a version of a data set that corresponds to a certain point in time;
scanning a first data structure representative of write operations that have been previously performed and a second data structure representative of revert operations that have been previously performed; and determining a location of the version of the data set that has been requested based on the first data structure and the second data structure that has been scanned.

3. The method according to claim 2, further comprising:
destaging different versions of the data set at the first storage unit and a second storage unit; and
maintaining a third data structure indicative of which version of data to send from the first storage unit to the second storage unit.

4. The method according to claim 1, further comprising:
maintaining a fourth data structure indicating a location of a version of a data set to be staged to the write-back cache unit.

5. The method according to claim 1, further comprising:
utilizing intercepts to provide a location of the version of the data set that has been requested.

6. The method according to claim 1, further comprising:
sending, in response to the destaging, an older version of the data set corresponding to the current version of the data set that has been destaged from the first storage unit to a second storage unit, the older version of the data set having been previously destaged from the write-back cache unit to the first storage unit.

7. The method according to claim 6, wherein sending the older version of the data set data comprises:
generating a dummy entry that comprises a timing of the sending of the older version of the data set.

8. The method according to claim 6, wherein sending the older version of the data set comprises:
staging the older version of the data set to the write-back cache unit and then destaging the older version of the data set from the write-back cache unit to the second storage unit.

9. The method according to claim 4, further comprising:
physically copying an old version of the data set from a second storage unit to the first storage unit, in response to a revert operation, while updating the fourth data structure.

10. A system for managing data, the system comprises:
at least one storage unit;
a write-back cache unit communicatively coupled to the at least one storage unit, the write-back cache unit being configured to;
 receive a request to write a new version of a data set to a certain cache data allocation unit of the write-back cache unit, the certain cache data allocation unit comprising a current version of the data set;
 analyze, in response to the request to write the new version of the data set being received, a data storage policy, the data storage policy indicating at least when the current version of the data set is to be overwritten and when the current version of the data set is to be destaged, the data storage policy also setting a length destage period for destaging the current version of the data set;
 destage, based on the data storage policy that has been analyzed, the current version of the data set from the certain cache data allocation unit to a first storage unit; and
 write, in response to the destaging, the new version of the data set to the certain cache allocation unit.

11. The system of claim 10, wherein the write-back cache unit is further configured to:
receive a request to read a version of a data set that corresponds to a certain point in time;
scan a first data structure representative of write operations that have been previously performed and a second data structure representative of revert operations that have been previously performed; and
determine a location of the version of the data set that has been requested based on the first data structure and the second data structure that has been scanned.

12. The system of claim 10, wherein the write-back cache unit is further configured to:
destage different versions of the data set at the first storage unit and a second storage unit; and
maintain a third data structure indicative of which version of the data set to send from the first storage unit to the second storage unit.

13. The system of claim 10, wherein the write-back cache unit is further configured to:
send, in response to the destaging, an older version of the data set corresponding to the current version of data that has been destaged from the first storage unit to a second storage unit, the older version of the data set having been previously destaged from the write-back cache unit to the first storage unit.

14. A computer program product for managing data, the computer program product comprising:
a non-transitory storage medium readable by a processing circuit and storing instructions for execution by the processing circuit for performing a method comprising:
 providing a write-back cache unit coupled to at least a first storage unit and a second storage unit;
 receiving, from an adapter, a request to write a new version of a data set to a certain cache data allocation unit of the write-back cache unit, the certain cache data allocation unit comprising a current version of the data set, wherein the new version of the data set is received from the adapter;
 analyzing, in response to receiving the request to write the new version of the data set, a data storage policy;
 destaging, based on the data storage policy that has been analyzed, the current version of the data set from the certain cache data allocation unit to the first storage unit;
 sending, via the write-back cache unit, an older version of the data set that is prior to the current version and stored within the first storage unit to the second storage unit; and
 writing, in response to the destaging, the new version of the data set received from the adapter to the certain cache allocation unit.

15. The computer program product of claim 14, wherein the method further comprises:
receiving a request to read a version of a data set that corresponds to a certain point in time;
scanning a first data structure representative of write operations that have been previously performed and a second data structure representative of revert operations that have been previously performed; and
determining a location of the version of the data set that has been requested based on the first data structure and the second data structure that has been scanned.

16. The computer program product of claim 14, wherein the method further comprises:
destaging different versions of the data set at the first storage unit and the second storage unit; and
maintaining a third data structure indicative of which version of the data set to send from the first storage unit to the second storage unit.

17. The computer program product of claim 14, wherein the method further comprises:
maintaining a fourth data structure indicating a location of a version of a data set to be staged to the write-back cache unit.

18. The computer program product of claim 14, wherein the older version of the data set having been previously destaged from the write-back cache unit to the first storage unit.

19. The computer program product of claim 14, wherein sending the older version of the data set comprises:
generating a dummy entry that comprises a timing of the sending of the older version of the data set.

20. The computer program product of claim 14, wherein sending the older version of data comprises:
staging the older version of the data set to the write-back cache unit and then destaging the older version of the data set from the write-back cache unit to the second storage unit.

21. A system for managing data, the system comprises:
at least one storage unit;
a write-back cache unit communicatively coupled to the at least one storage unit;
a management unit communicatively coupled to the write-back cache unit, wherein the management unit is situated separate from the write-back cache unit, and wherein the management unit is configured to:
receive a request from an adapter to write a new version of a data set to a certain cache data allocation unit of the write-back cache unit, the certain cache data allocation unit comprising a current version of the data set, and wherein the new version of the data set is received from the adapter;
analyzing, based on receiving the request to write the new version of the data set, a data storage policy, the data storage policy indicating at least when the current version of the data set is to be overwritten and when the current version of the data set is to be destaged;
destaging, based on the data storage policy that has been analyzed, the current version of the data set from the certain cache data allocation unit to first storage unit; and
writing, by the management unit based on the destaging, the new version of the data set received from the adapter to the certain cache allocation unit.

22. A computer program product for managing data, the computer program product comprising:
a non-transitory storage medium readable by a processing circuit and storing instructions for execution by the processing circuit for performing a method comprising:
receiving, by a management unit coupled to a write-back cache, a request from an adapter to write a new version of a data set to a certain cache data allocation unit of the write-back cache unit, wherein the write-back cache is situated separate from the management unit, the certain cache data allocation unit comprising a current version of the data set, and wherein the new version of the data set is received from the adapter;
analyzing, by the management unit based on receiving the request to write the new version of the data set, a data storage policy, the data storage policy indicating at least when the current version of the data set is to be overwritten and when the current version of the data set is to be destaged;
destaging, based on the data storage policy that has been analyzed, the current version of the data set from the certain cache data allocation unit to a first storage unit; and
writing, by the management unit based on the destaging, the new version of the data set received from the adapter to the certain cache allocation unit.

23. A method for managing data, the method comprising:
receiving, by a write-back cache unit communicatively coupled to at least one storage unit, a request to write a new version of a data set to a certain cache data allocation unit of the write-back cache unit, the certain cache data allocation unit comprising a current version of the data set;
analyzing, by the write-back cache unit in response to receiving the request to write the new version of the data set, a data storage policy, the data storage policy indicating at least when the current version of the data set is to be overwritten and when the current version of the data set is to be destaged, the data storage policy also setting a length destage period for destaging the current version of the data set;
destaging, by the write-back cache unit based on the data storage policy that has been analyzed, the current version of the data set from the certain cache data allocation unit to a first storage unit; and
writing, by the write-back cache unit in response to the destaging, the new version of the data set to the certain cache allocation unit.

24. A computer program product for managing data, the computer program product comprising:
a non-transitory storage medium readable by a processing circuit and storing instructions for execution by the processing circuit for performing a method comprising:
receiving, by a write-back cache unit communicatively coupled to at least one storage unit, a request to write a new version of a data set to a certain cache data allocation unit of the write-back cache unit, the certain cache data allocation unit comprising a current version of the data set;
analyzing, by the write-back cache unit in response to receiving the request to write the new version of the data set, a data storage policy, the data storage policy indicating at least when the current version of the data set is to be overwritten and when the current version of the data set is to be destaged, the data storage policy also setting a length destage period for destaging the current version of the data set;
destaging, by the write-back cache unit based on the data storage policy that has been analyzed, the current version of the data set from the certain cache data allocation unit to a first storage unit; and
writing, by the write-back cache unit in response to the destaging, the new version of the data set to the certain cache allocation unit.

25. A method for managing data, the method comprising:
receiving, from an adapter, a request to write a new version of a data set to a certain cache data allocation unit of a write-back cache unit, the write-back cache unit being coupled to at least a first storage unit and a second storage unit, wherein the certain cache data allocation unit comprises a current version of the data set, and wherein the new version of the data set is received from the adapter;
analyzing, in response to receiving the request to write the new version of the data set, a data storage policy;

destaging, based on the data storage policy that has been analyzed, the current version of the data set from the certain cache data allocation unit to the first storage unit;

sending, via the write-back cache unit, an older version of the data set that is prior to the current version and stored within the first storage unit to the second storage unit; and writing, in response to the destaging, the new version of the data set received from the adapter to the certain cache allocation unit.

26. A system for managing data, the system comprises:

a first storage unit;

at least a second storage unit;

a write-back cache unit communicatively coupled to the first storage unit and the at least second storage unit;

a management unit communicatively coupled to the write-back cache unit, the write-back cache unit being configured to:

receive, from an adapter, a request to write a new version of a data set to a certain cache data allocation unit of a write-back cache unit, the write-back cache unit being coupled to at least a first storage unit and a second storage unit, wherein the certain cache data allocation unit comprises a current version of the data set, and wherein the new version of the data set is received from the adapter;

analyze, in response to the request to write the new version of the data set being received, a data storage policy;

destage, based on the data storage policy that has been analyzed, the current version of the data set from the certain cache data allocation unit to the first storage unit;

send an older version of the data set that is prior to the current version and stored within the first storage unit to the second storage unit; and write, in response to the destaging, the new version of the data set received from the adapter to the certain cache allocation unit.

* * * * *